US012101726B2

(12) United States Patent
Liu et al.

(10) Patent No.: US 12,101,726 B2
(45) Date of Patent: Sep. 24, 2024

(54) SYNCHRONIZATION FOR MULTI-TRANSMISSION RECEPTION POINT COMMUNICATIONS IN NON-TERRESTRIAL NETWORKS

(71) Applicant: QUALCOMM Incorporated, San Diego, CA (US)

(72) Inventors: Le Liu, San Jose, CA (US); Alberto Rico Alvarino, San Diego, CA (US); Chiranjib Saha, San Diego, CA (US); Peter Gaal, San Diego, CA (US); Harikumar Krishnamurthy, San Diego, CA (US); Ayan Sengupta, San Diego, CA (US); Bharat Shrestha, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/057,630

(22) Filed: Nov. 21, 2022

(65) Prior Publication Data
US 2024/0172144 A1     May 23, 2024

(51) Int. Cl.
*H04B 7/01* (2006.01)
*H04L 5/00* (2006.01)
*H04W 56/00* (2009.01)

(52) U.S. Cl.
CPC ......... *H04W 56/0005* (2013.01); *H04B 7/01* (2013.01); *H04L 5/0035* (2013.01); *H04W 56/0055* (2013.01)

(58) Field of Classification Search
CPC ......... H04W 56/0005; H04W 56/0055; H04W 56/00; H04W 56/001; H04W 56/004;
(Continued)

(56) References Cited

U.S. PATENT DOCUMENTS

2021/0360611 A1    11/2021  Manolakos et al.
2022/0078815 A1*   3/2022   Manolakos .......... H04L 5/0048
(Continued)

FOREIGN PATENT DOCUMENTS

CA    3145261 A1 *  7/2022  .......... H04L 5/0051
CA    3146709 A1 *  7/2022  .......... H04W 72/02
(Continued)

OTHER PUBLICATIONS

Huawei, et al "On UE features for other Rel-17 work items", R1-2205787, 3rd Generation Partnership Project, Mobile Competence Centre, 650, Route Des Lucioles, F-06921, Sophia-Antipolis Cedex, France, vol. RAN WG1, No. Toulouse, France, Aug. 22, 2022-Aug. 26, 2022, Aug. 12, 2022, XP052273718, 28 Pages, sections 2,5,6.

(Continued)

*Primary Examiner* — Phong La
(74) *Attorney, Agent, or Firm* — Holland & Hart LLP

(57) ABSTRACT

Methods, systems, and devices for wireless communications are described. Some wireless communications systems may support non-terrestrial network (NTN) signaling between both terrestrial and non-terrestrial devices. A user equipment (UE) supporting such NTN signaling may receive a downlink message indicating a first configuration for a first transmission reception point corresponding to a first cell of the NTN, and a second configuration for a second transmission reception point corresponding to a second cell of the NTN. The UE may then perform one or more synchronization measurements to synchronize uplink communications with the first transmission reception point and the second transmission reception point and in order to perform multi-transmission reception point communications in the NTN. The UE may then transmit one or more uplink messages to the first transmission reception point, to the second trans-
(Continued)

mission reception point, or both, in accordance with the one or more synchronization measurements.

30 Claims, 17 Drawing Sheets

(58) Field of Classification Search
CPC ............. H04W 56/0035; H04L 5/0035; H04L 5/0033; H04L 5/0032; H04B 7/01; H04B 7/005
See application file for complete search history.

(56) References Cited

U.S. PATENT DOCUMENTS

| | | | | |
|---|---|---|---|---|
| 2022/0210844 | A1* | 6/2022 | MolavianJazi | H04L 5/005 |
| 2022/0225265 | A1* | 7/2022 | Jeong | H04W 60/04 |
| 2022/0255667 | A1* | 8/2022 | Cao | H04L 5/0094 |
| 2022/0329975 | A1* | 10/2022 | Jeong | G01S 19/51 |
| 2023/0048881 | A1* | 2/2023 | Zhu | H04L 5/0051 |
| 2023/0129437 | A1* | 4/2023 | Jeong | H04W 48/20 370/331 |
| 2023/0194649 | A1* | 6/2023 | Thomas | G01S 5/0246 370/252 |
| 2023/0216639 | A1* | 7/2023 | Wang | H04L 5/0094 370/329 |
| 2023/0224783 | A1* | 7/2023 | Jiang | H04W 36/14 455/436 |

FOREIGN PATENT DOCUMENTS

| | | | |
|---|---|---|---|
| CN | 116015376 A | * | 4/2023 |
| JP | 2023512218 A | * | 1/2021 |
| WO | WO-2022008801 A1 | * | 1/2022 |
| WO | WO-2022068764 A1 | * | 4/2022 |
| WO | WO-2023014894 A1 | * | 2/2023 |

OTHER PUBLICATIONS

International Search Report and Written Opinion—PCT/US2023/076726—ISA/EPO—Feb. 7, 2024.

* cited by examiner

SYNCHRONIZATION FOR MULTI-TRANSMISSION RECEPTION POINT COMMUNICATIONS IN NON-TERRESTRIAL NETWORKS

FIELD OF TECHNOLOGY

The following relates to wireless communications, including synchronization for multi-transmission reception point (mTRP) communications in non-terrestrial networks (NTNs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support synchronization for multi-transmission reception point (mTRP) communications in non-terrestrial networks (NTNs). For example, the described techniques provide support for increased coverage and signaling support for mTRP communications in NTNs. For example, a network entity may configure a user equipment (UE) with information to perform mTRP communications for NTNs. Such information may include one or more downlink messages that include a configuration for a serving cell (associated with a first NTN TRP) and an additional NTN related configuration of a non-serving cell or virtual cell (associated with one or more secondary NTN TRPs). Such mTRP NTN configuration information may allow the UE to perform one or more synchronization measurements with the serving cell and the non-serving cell, and correspondingly communicate uplink signaling with multiple TRPs present in the NTN.

A method for wireless communication at a UE is described. The method may include receiving a downlink message indicating a first configuration for a first TRP corresponding to a first cell of an NTN and a second configuration for a second TRP corresponding to a second cell of the NTN, performing, based on the first configuration and the second configuration of the downlink message, one or more synchronization measurements for synchronizing uplink communications with the first TRP and the second TRP, and transmitting one or more uplink messages to the first TRP, the second TRP, or both, in accordance with the one or more synchronization measurements.

An apparatus for wireless communication at a UE is described. The apparatus may include a processor, memory coupled with the processor, and instructions stored in the memory. The instructions may be executable by the processor to cause the apparatus to receive a downlink message indicating a first configuration for a first TRP corresponding to a first cell of an NTN and a second configuration for a second TRP corresponding to a second cell of the NTN, perform, based on the first configuration and the second configuration of the downlink message, one or more synchronization measurements for synchronizing uplink communications with the first TRP and the second TRP, and transmit one or more uplink messages to the first TRP, the second TRP, or both, in accordance with the one or more synchronization measurements.

Another apparatus for wireless communication at a UE is described. The apparatus may include means for receiving a downlink message indicating a first configuration for a first TRP corresponding to a first cell of an NTN and a second configuration for a second TRP corresponding to a second cell of the NTN, means for performing, based on the first configuration and the second configuration of the downlink message, one or more synchronization measurements for synchronizing uplink communications with the first TRP and the second TRP, and means for transmitting one or more uplink messages to the first TRP, the second TRP, or both, in accordance with the one or more synchronization measurements.

A non-transitory computer-readable medium storing code for wireless communication at a UE is described. The code may include instructions executable by a processor to receive a downlink message indicating a first configuration for a first TRP corresponding to a first cell of an NTN and a second configuration for a second TRP corresponding to a second cell of the NTN, perform, based on the first configuration and the second configuration of the downlink message, one or more synchronization measurements for synchronizing uplink communications with the first TRP and the second TRP, and transmit one or more uplink messages to the first TRP, the second TRP, or both, in accordance with the one or more synchronization measurements.

In some examples of the method, apparatuses, and non-transitory computer-readable medium described herein, the downlink message includes a control resource set (CORESET) configuration message and the method, apparatuses, and non-transitory computer-readable medium may include further operations, features, means, or instructions for receiving an indication of the first TRP based on a first CORESET pool index of the CORESET configuration message and the second TRP based on a second CORESET pool index of the CORESET configuration message.

Some examples of the method, apparatuses, and non-transitory computer-readable medium described herein may further include operations, features, means, or instructions for decoding first transmission configuration indicator (TCI) state information associated with the first CORESET pool index and second TCI state information associated with the second CORESET pool index, where the first TCI state information includes the first configuration for the first TRP and the second TCI state information includes the second configuration for the second TRP.

In some examples of the method, apparatuses, and non-transitory computer-readable medium described herein, the downlink message includes a unified TCI state information message and the method, apparatuses, and non-transitory computer-readable medium may include further operations, features, means, or instructions for receiving the first configuration for the first TRP and the second configuration for the second TRP based on the unified TCI state information message.

In some examples of the method, apparatuses, and non-transitory computer-readable medium described herein, the unified TCI state information message includes joint downlink and uplink TCI state information, or separate downlink and uplink TCI state information, synchronization signal block (SSB)-machine type communication (MTC) information, or any combination thereof.

Some examples of the method, apparatuses, and non-transitory computer-readable medium described herein may further include operations, features, means, or instructions for performing, based on the unified TCI state information message, the one or more synchronization measurements on one or more SSBs associated with the first cell and the second cell of the NTN by applying respective timing advances for the one or more synchronization measurements.

In some examples of the method, apparatuses, and non-transitory computer-readable medium described herein, the downlink message includes a spatial relation information message and the method, apparatuses, and non-transitory computer-readable medium may include further operations, features, means, or instructions for receiving the first configuration for the first TRP and the second configuration for the second TRP based on the spatial relation information message.

In some examples of the method, apparatuses, and non-transitory computer-readable medium described herein, the spatial relation information message includes a SSB information field corresponding to the first cell, the second cell, or both, that indicates the first configuration for the first TRP, the second configuration for the second TRP, or both.

In some examples of the method, apparatuses, and non-transitory computer-readable medium described herein, the spatial relation information message includes SRS positioning information corresponding to the first configuration for the first TRP and the second configuration for the second TRP.

In some examples of the method, apparatuses, and non-transitory computer-readable medium described herein, the spatial relation information message includes an indication of sounding reference signals (SRSs) corresponding to the first configuration for the first TRP and the second configuration for the second TRP.

In some examples of the method, apparatuses, and non-transitory computer-readable medium described herein, the spatial relation information message includes an indication of physical uplink control channels corresponding to the first configuration for the first TRP and the second configuration for the second TRP.

Some examples of the method, apparatuses, and non-transitory computer-readable medium described herein may further include operations, features, means, or instructions for transmitting, to a network entity, a message that indicates a capability of the UE to communicate with the first TRP and the second TRP in the NTN.

In some examples of the method, apparatuses, and non-transitory computer-readable medium described herein, the second configuration includes a configuration of a virtual cell, and performing the one or more synchronization measurements may include operations, features, means, or instructions for performing the one or more synchronization measurements relative to the virtual cell that may be spatially in between the first TRP and the second TRP to synchronize the uplink communications at least partially with the first TRP and the second TRP and transmitting the one or more uplink messages to the first TRP and the second TRP based on performing the one or more synchronization measurements relative to the virtual cell.

In some examples of the method, apparatuses, and non-transitory computer-readable medium described herein, receiving the downlink message may include operations, features, means, or instructions for receiving a third configuration for a third TRP corresponding to a third cell of the NTN and performing, based on the third configuration, the one or more synchronization measurements to synchronize the uplink communications with the first TRP, the second TRP, and the third TRP.

In some examples of the method, apparatuses, and non-transitory computer-readable medium described herein, the first configuration for the first TRP and the second configuration for the second TRP include timing information, non-terrestrial network configuration information, a physical cell identifier, a virtual cell identifier, or any combination thereof.

In some examples of the method, apparatuses, and non-transitory computer-readable medium described herein, the one or more synchronization measurements include Doppler shift pre-compensation measurements associated with the first TRP and the second TRP in the NTN.

In some examples of the method, apparatuses, and non-transitory computer-readable medium described herein, the first configuration for the first TRP includes a first physical cell identifier or a first virtual cell identifier, and the second configuration for the second TRP includes a second physical cell identifier or a second virtual cell identifier.

A method for wireless communication at a network entity is described. The method may include transmitting, to a UE a downlink message indicating a first configuration for a first TRP corresponding to a first cell of an NTN and a second configuration for a second TRP corresponding to a second cell of the NTN, performing, based on the first configuration and the second configuration of the downlink message, one or more synchronization measurements for synchronizing communications with the first TRP, the second TRP, and the UE, and receiving one or more uplink messages from the UE in accordance with the one or more synchronization measurements.

An apparatus for wireless communication at a network entity is described. The apparatus may include a processor, memory coupled with the processor, and instructions stored in the memory. The instructions may be executable by the processor to cause the apparatus to transmit, to a UE a downlink message indicating a first configuration for a first TRP corresponding to a first cell of an NTN and a second configuration for a second TRP corresponding to a second cell of the NTN, perform, based on the first configuration and the second configuration of the downlink message, one or more synchronization measurements for synchronizing communications with the first TRP, the second TRP, and the UE, and receive one or more uplink messages from the UE in accordance with the one or more synchronization measurements.

Another apparatus for wireless communication at a network entity is described. The apparatus may include means for transmitting, to a UE a downlink message indicating a first configuration for a first TRP corresponding to a first cell of an NTN and a second configuration for a second TRP corresponding to a second cell of the NTN, means for performing, based on the first configuration and the second configuration of the downlink message, one or more synchronization measurements for synchronizing communications with the first TRP, the second TRP, and the UE, and means for receiving one or more uplink messages from the UE in accordance with the one or more synchronization measurements.

A non-transitory computer-readable medium storing code for wireless communication at a network entity is described. The code may include instructions executable by a processor to transmit, to a UE a downlink message indicating a first configuration for a first TRP corresponding to a first cell of an NTN and a second configuration for a second TRP corresponding to a second cell of the NTN, perform, based on the first configuration and the second configuration of the downlink message, one or more synchronization measurements for synchronizing communications with the first TRP, the second TRP, and the UE, and receive one or more uplink messages from the UE in accordance with the one or more synchronization measurements.

In some examples of the method, apparatuses, and non-transitory computer-readable medium described herein, the downlink message includes a CORESET configuration message and the method, apparatuses, and non-transitory computer-readable medium may include further operations, features, means, or instructions for transmitting, to the UE, an indication of the first TRP based on a first CORESET pool index of the CORESET configuration message and the second TRP based on a second CORESET pool index of the CORESET configuration message.

In some examples of the method, apparatuses, and non-transitory computer-readable medium described herein, the downlink message further includes first TCI state information associated with the first CORESET pool index and second TCI state information associated with the second CORESET pool index and the first TCI state information includes the first configuration for the first TRP and the second TCI state information includes the second configuration for the second TRP.

In some examples of the method, apparatuses, and non-transitory computer-readable medium described herein, the downlink message includes a unified TCI state information message and the method, apparatuses, and non-transitory computer-readable medium may include further operations, features, means, or instructions for transmitting, to the UE, the first configuration for the first TRP and the second configuration for the second TRP based on the unified TCI state information message.

In some examples of the method, apparatuses, and non-transitory computer-readable medium described herein, the unified TCI state information message includes joint downlink and uplink TCI state information, or separate downlink and uplink TCI state information, SSB-machine type communication information, or a combination thereof.

In some examples of the method, apparatuses, and non-transitory computer-readable medium described herein, the downlink message includes a spatial relation information message and the method, apparatuses, and non-transitory computer-readable medium may include further operations, features, means, or instructions for transmitting, to the UE, the first configuration for the first TRP and the second configuration for the second TRP based on the spatial relation information message.

In some examples of the method, apparatuses, and non-transitory computer-readable medium described herein, the spatial relation information message includes a SSB information field corresponding to the first cell, the second cell, or both, that indicates the first configuration for the first TRP, the second configuration for the second TRP, or both.

In some examples of the method, apparatuses, and non-transitory computer-readable medium described herein, the spatial relation information message includes SRS positioning information corresponding to the first configuration for the first TRP and the second configuration for the second TRP.

Some examples of the method, apparatuses, and non-transitory computer-readable medium described herein may further include operations, features, means, or instructions for receiving a message that indicates a capability of the UE to communicate with the first TRP and the second TRP in the NTN.

In some examples of the method, apparatuses, and non-transitory computer-readable medium described herein, the second configuration includes a configuration of a virtual cell and the method, apparatuses, and non-transitory computer-readable medium may include further operations, features, means, or instructions for receiving, from the UE, the one or more uplink messages synchronized to the virtual cell and performing one or more post-processing procedures to synchronize the one or more uplink messages to timings of the first cell and the second cell.

In some examples of the method, apparatuses, and non-transitory computer-readable medium described herein, receiving the downlink message may include operations, features, means, or instructions for transmitting a third configuration for a third TRP corresponding to a third cell of the NTN and performing, based on the third configuration, the one or more synchronization measurements to synchronize the communications with the first TRP, the second TRP, the third TRP, and the UE.

DETAILED DESCRIPTION

Some wireless communications systems may support multi-transmission reception point TRP (mTRP) communications, which enables a network entity to use more than one TRP to communicate with user equipment (UE). Such mTRP communications may increase overall network performance and coverage, improve mobility between cells, while reducing signaling overhead. To effectively communicate with multiple TRPs, a UE may synchronize with different cells associated with multiple different TRPs, for example, by applying different timing advances to communications received from or sent to the multiple TRPs. Such synchronization procedures for mTRP communications are relatively accurate in terrestrial based networks, where the Doppler drift and other timing issues are correspondingly small.

In non-terrestrial networks (NTNs), however, mTRP synchronization becomes challenging due to increased Doppler drift and timing mismatches between devices that are further away from one another (e.g., relative to the distances between devices in conventional terrestrial networks). Thus, NTN networks may support various different techniques to accurately compensate for such differences between terrestrial-based networks and NTNs to support mTRP communications.

In some implementations, a network entity may configure a UE with information to perform mTRP communications for NTNs. For example, a UE may receive configuration information for a serving cell and an additional NTN related configuration of a non-serving cell, TRP, or virtual cell that may allow the UE to communicate with multiple TRPs present in the NTN. In such implementations, the network entity may configure the UE with multiple NTN mTRP configurations instead of a single NTN TRP configuration.

In some examples, the network entity may signal the serving and non-serving cell information for mTRP in a downlink transmission configuration indicator (TCI) state associated with a control resource set (CORESET) message. In some other examples, the network entity may signal the serving and non-serving cell information for mTRP using a unified TCI framework message. In some other examples, the network entity may signal the serving and non-serving cell information for mTRP using an uplink spatial relation info message. Additionally or alternatively, the UE may use the NTN mTRP configuration information to synchronize with a virtual cell or a reference point that is in between the multiple TRPs, so that the UE sends an averaged signal to both TRPs rather than synchronizing with both TRPs separately.

Aspects of the disclosure are initially described in the context of wireless communications systems, for example, wireless communications systems in NTN settings. Aspects of the disclosure are further illustrated by and described with reference to a process flow, apparatus diagrams, system diagrams, and flowcharts that relate to synchronization for mTRP communications in NTNs.

Figure 1:
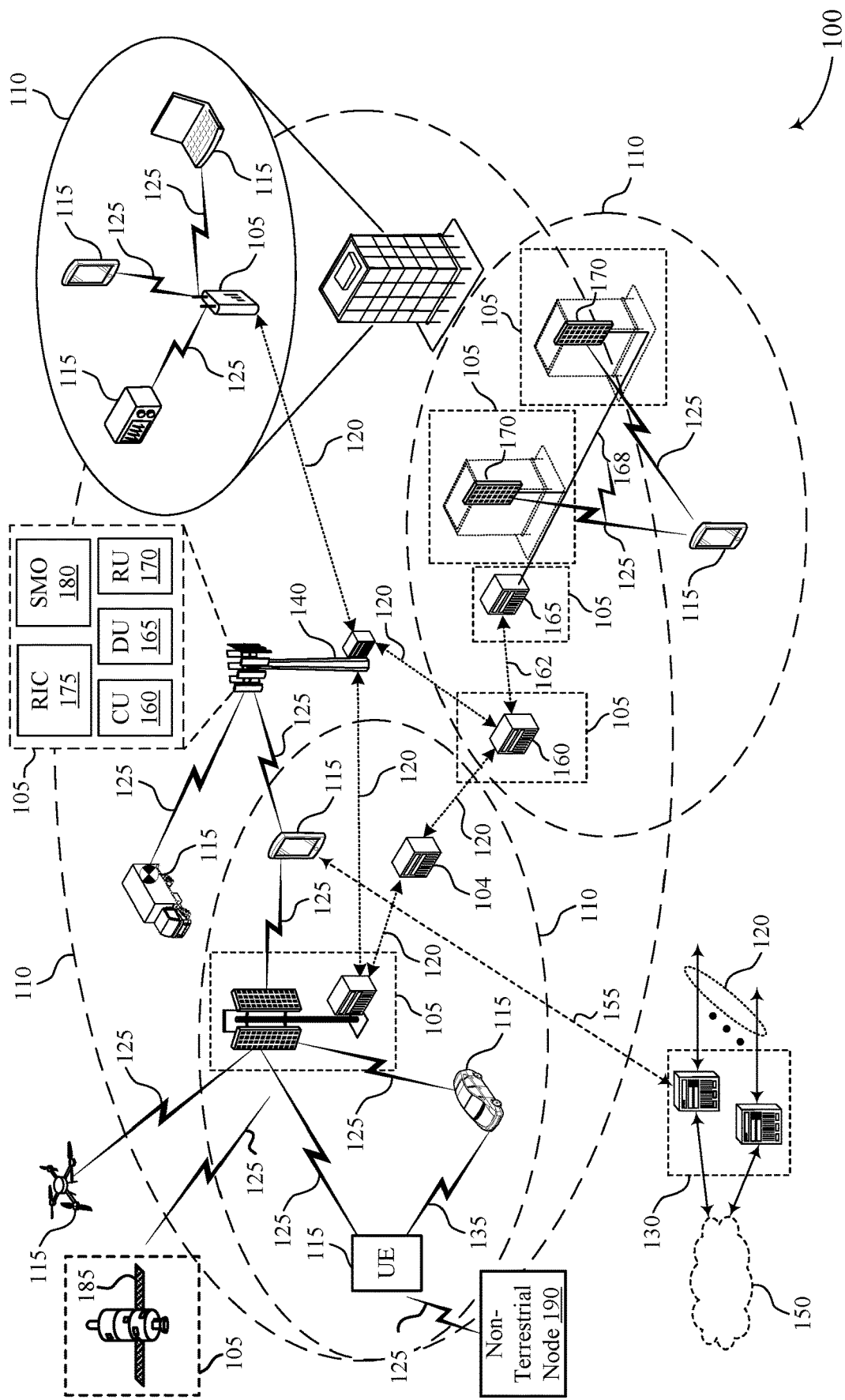
FIGS. 1, 2, and 3 illustrate examples of wireless communications systems that supports synchronization for multi-transmission reception point (mTRP) communications in non-terrestrial networks (NTNs) in accordance with one or more aspects of the present disclosure.

FIG. 1 illustrates an example of a wireless communications system 100 that supports synchronization for mTRP communications in NTNs in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support synchronization for mTRP communications in NTNs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may support NTN communications between network nodes of the wireless communications system 100. For example, the wireless communications system 100 may be an example of an NTN that supports communications between NTN nodes and terrestrial network nodes. For instance, as described herein, a network entity 105 may refer to a terrestrial communication device (such as a base station 140) or a non-terrestrial communication device (such as a satellite 185, a balloon, a drone, a non-terrestrial node, a high-altitude platform (HAP) station, or another non-terrestrial device). In some examples, a NTN network entity 105 may be connected to (e.g., communicate with) a terrestrial network entity 105 via a gateway. In some examples, a NTN network entity 105 may correspond to a first cell type (e.g., an NTN cell type), and a terrestrial network entity 105 may correspond to a second cell type (e.g., a terrestrial cell type) different from the first cell type.

In some examples, a NTN network entity 105 may provide coverage to areas in which a terrestrial network entity 105 may be unavailable. A channel corresponding to the NTN network entity 105 may be characterized with strong line of sight conditions, as a signal provided by the NTN network entity 105 may be reflected at the sky (e.g., as opposed to a signal corresponding to a terrestrial network entity 105 which may travel over a ground surface). A footprint of a beam radiated from the NTN network entity 105 may have a relatively clear boundary (e.g., as compared to terrestrial network entity 105 beam boundaries), and a UE 115 may be likely to operate within a single beam serving area (e.g., except in cases where a UE 115 is located at the boundary between two serving areas). In some examples, a serving area for a beam corresponding to the NTN network entity 105 may be larger than a serving area for a beam corresponding to a terrestrial network entity 105.

An NTN network entity 105, such as a satellite 185, may move over time and support various coverage scenarios. For example, the NTN network entity 105 may support a moving cell or beam coverage scenario in which the cell footprint or beam footprint moves together with the satellite 185. Alternatively, the NTN network entity 105 may support a quasi-earth fixed cell or beam coverage scenario in which the cell footprint of beam footprint remains static for a period of time as the NTN network entity 105 moves through space.

Additionally, or alternatively, the wireless communications system 100 may support one or more non-terrestrial nodes 190. For the purposes of the present disclosure, non-terrestrial nodes 190 may include, but are not limited to, aircraft, UAVs, drones, HAPs, and the like. For example, as shown in FIG. 1, a UE 115 may be communicatively coupled to a satellite 185 (e.g., NTN node), a non-terrestrial node 190, or both, via one or more communication links 125.

Wireless communications system 100 may support mTRP-based communications to enable base stations or network entities 105 to use more than one TRP to communicate with UE 115. Such mTRP communications may increase network performance, reliability, and throughput. In some examples, the wireless communications system may support mTRP-based uplink communications such as mTRP-based PUCCH and PUSCH in terrestrial networks or NTNs. In terrestrial network scenarios, wireless communications system 100 may support intra-cell mTRP communications, where two or more TRPs may share the same physical cell identifier (PCI). In such cases, two TRPs may be mapped to different control resource set (CORESET) pool values (e.g., coresetPoolIndex values) corresponding to different associated TRPs, cells, or both, which may include one or more values configured in the CORESET of a downlink control channel configuration message (e.g., PDCCH-Config).

In some other implementations, the wireless communications system 100 may support inter-cell mTRP, where two or more TRPs can have different TRP/cell identities (e.g., physical cell IDs (PCIs)) and may be associated with a single timing advance value. In such implementations, the wireless communications system 100 may support time division multiplexing for reliable mTRP uplink repetition, and serving cell PCIs and neighbor cell PCIs may be mapped to different CORESET values (e.g., coresetPoolIndex values) by using associated downlink TCI-states which includes additional TRP identity information, cell identity information (e.g., additionalPCI-r17 info), or both. Additionally or alternatively, for uplink configurations, mTRP serving cell communications can be based on spatial relation information for PUCCH or SRS signaling.

In some implementations, wireless communications system 100 may support simultaneous uplink multi-panel transmission at frequency ranges (e.g., FR1 or FR2) using mTRP techniques to increase system capacity. Additionally or alternatively, wireless communications system 100 may support spatial division multiplexing, frequency division multiplexing, single frequency network communications, or any combination thereof for PUSCH and PUCCH. The mTRP communications may also support two TAs for inter-cell multi-DCI uplink mTRPs, where the timing differences between mTRPs may be relatively similar to timing differences for inter-band carrier aggregation.

In some other implementations, the wireless communications system 100 may support mTRP based communications (e.g., mTRP-based PUCCH and PUSCH) in NTNs to increase coverage and to extend the unified TCI framework for mTRP communications to increase overall network performance and coverage, improve mobility between cells, while reducing signaling overhead. To effectively communicate with multiple TRPs, a UE 115 may synchronize with different cells associated with multiple different TRPs. In NTNs, however, mTRP synchronization may be associated with increased Doppler drift and timing mismatches between devices that are further away from one another relative to terrestrial networks. Thus, NTN networks may support various different techniques to accurately compensate for such differences and to support mTRP communications.

In some implementations, a network entity 105 may configure a UE 115 with information to perform mTRP communications for NTNs. For example, the network entity 105 may transmit configuration information for a serving cell and an additional NTN related configuration of a non-serving cell, TRP, or virtual cell that may allow the UE 115 to communicate with multiple TRPs (for example, satellites 185 or non-terrestrial nodes 190) present in the NTN. In some examples, the network entity 105 may signal the serving and non-serving cell information for mTRP in a downlink TCI state associated with a CORESET message. In some other examples, the network entity 105 may signal the serving and non-serving cell information for mTRP using a unified TCI framework message. In some other examples, the network entity 105 may signal the serving and non-serving cell information for mTRP using an uplink spatial relation info message.

Figure 2:
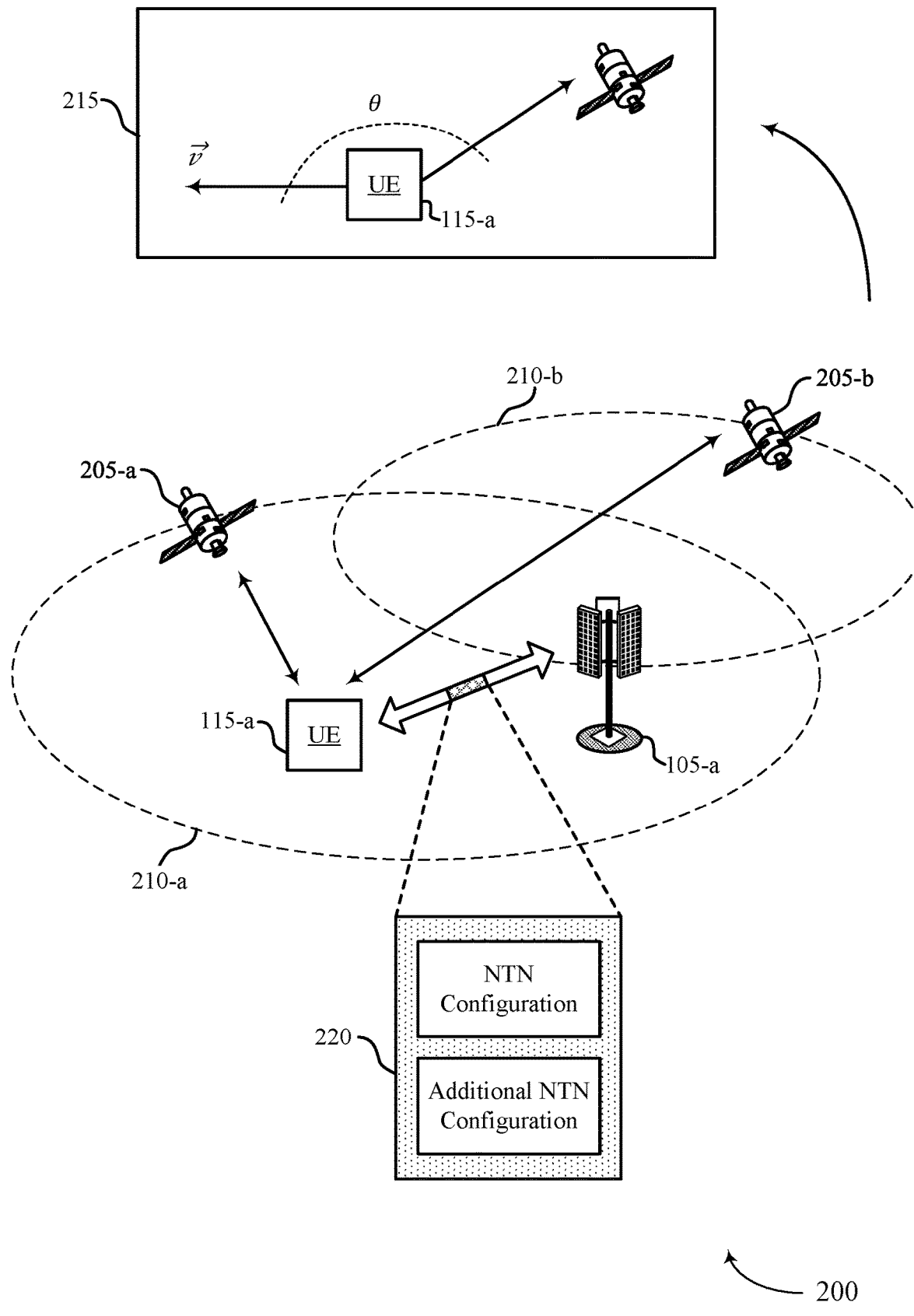

FIG. 2 illustrates an example of a wireless communications system 200 that supports synchronization for mTRP communications in NTNs in accordance with one or more aspects of the present disclosure. For example, FIG. 2 may illustrate communications between a UE 115-a, a network entity 105-a, a first satellite or first NTN TRP 205-a, a second satellite or second NTN TRP 205-b, or any combination thereof. In some examples, the network entity 105-a may be an example or a terrestrial network entity or a non-terrestrial network entity. Additionally or alternatively, the first NTN TRP 205-a and the second NTN TRP 205-b may in some cases be examples of NTN network entities, and may be associated with coverage area or cell 210-a and coverage area or cell 210-b, respectively.

To support accurate frame timing and synchronization for uplink communications between the UE 115-a and the NTN TRPs, the UE 115-a may perform various timing compensation and pre-compensation techniques to account for the timing difference per-NTN TRP, which may be expressed as:

$$T_{TA}=(N_{TA}+N_{TA,UE\text{-}specific}+N_{TA,common}+N_{TA,offset})\times T_c,$$

where $T_{TA}$ is the timing advance (e.g., an open loop timing advance) applied by the UE 115-a. $N_{TA}$ is the timing advance is a network-selected timing advance value received by the UE 115-a via control signaling, and may be defined as 0 for a physical random access channel (PRACH) and may be updated or accumulated based on a timing advance command field in the control signaling (e.g., msg2/msgB and MAC CE timing advance command). $N_{TA,UE\text{-}specific}$ is a UE-specific timing advance that is self-estimated by the UE 115-a based on position information of the UE 115-a and the ephemeris information (e.g., EphemerisInfo) to pre-compensate for service link delay. $N_{TA,common}$ is a network-controlled common timing advance used to pre-compensate the link delay between SRP and satellite based on the one-way propagation delay:

$$\text{Delay}_{common}(t) = \frac{TACommon(t)}{2} +$$

-continued $$\frac{TACommonDrift}{2}(t-t_{epoch}) + \frac{TACommonDriftVariation}{2}(t-t_{epoch})^2.$$

$N_{TA,offset}$ is a timing advance offset derived from n-TiminggAdvanceOffset configured in ServingCellConfigCommon information element, and $T_c$ is a constant timing parameter. In such implementations, the timing difference per NTN TRP may be relatively larger in NTN scenarios than in terrestrial networks based on the relatively larger distances between NTN TRPs (as compared to distances between terrestrial TRPs).

In addition, the UE 115-a may compensate for the Doppler drift 215 per NTN TRP which may be relatively larger than Doppler drift 215 in terrestrial settings due to relatively larger distances between NTN TRPs and higher speeds per NTN TRP relative to the UE 115-a. For example, the Doppler drift 215 ($f_d$) per NTN TRP may be equal to:

$$f_d = F_c \times \frac{|\vec{v}|\cos(\theta)}{c},$$

where UE 115-a transmits at a frequency $F_c$ in the uplink, and $\vec{v}$ denotes the relative velocity of the UE 115-a with respect to the NTN TRP 205-a or the NTN TRP 205-b, and θ is the angle of the relative velocity vector $\vec{v}$.

The UE 115-a may perform various pre-compensation measurements to support accurate time and frequency pre-compensation for inter-satellite mTRP uplink communications. For example, the UE 115-a may configure two different timing advance values for communications with the NTN TRP 205-a and the NTN TRP 205-b. Additionally or alternatively, the UE 115-a may identify the location of each NTN TRP to estimate $\vec{v}/\theta$. In some examples, the UE 115-a may receive a downlink NTN configuration message (e.g., a NTN-Config message) that includes various parameters that the UE 115-a may use for performing timing and frequency pre-compensation in the wireless communications system 200. For example, the NTN configuration message may include epoch timing information, validity duration information, cell-specific offset timing information, timing advance information, polarization information, ephemeris information, or a combination thereof. In some examples, the UE 115-a may calculate and pre-compensate the uplink doppler drift in the service link based on the ephemeris information (e.g., EphemerisInfo) for the NTN TRP 205-a, the NTN TRP 205-b, or both, with a scheduling offset, $K_{offset}$ and $K_{mac}$, which are introduced for PUSCH and PUCCH communications. The UE 115-a may receive the NTN configuration message per serving cell and per neighboring cell via a system information block (SIB) such as SIB19. Additionally or alternatively, the UE 115-a may receive the NTN configuration message of the serving cell in a serving cell common configuration message (e.g., ServingCellConfigCommon), which the UE 115-a may receive via dedicated signaling.

To support mTRP communications in the wireless communications system 200, the network entity 105-a may use more than one TRP to communicate with UE 115-a. Such mTRP communications may increase network performance and robustness while reducing signaling overhead, and may increase beam selection efficiency to improve mobility between cells. To effectively communicate with the NTN TRP 205-a and the NTN TRP 205-b (and possibly a quantity of additional NTN TRPs), the UE 115-a may synchronize communications with cell 210-a (associated by NTN TRP 205-a), and with cell 210-b (associated with NTN TRP 205-b). For example, the UE 115-a may perform pre-compensation by applying different timing advances to communications received from or sent to the multiple NTN TRPs to account for different Doppler drift and other time and frequency mismatches. In such examples, the UE 115-a may receive information related to both a serving cell (e.g., cell 210-a associated with the first NTN TRP 205-a) and a non-serving cell (e.g., cell 210-b associated with NTN TRP 205-b), which the UE 115-a may use to perform time and frequency pre-compensation for mTRP NTN communications.

In some examples, the network entity 105-a may transmit, to the UE 115-a, multiple NTN configurations for mTRP communications (e.g., instead of a single configuration for sTRP). The multiple NTN configurations may include information that the UE 115-a a may use to synchronize with and perform mTRP communications with the NTN TRP 205-a and the NTN TRP 205-b. For example, the UE may receive configuration information for NTN communications (e.g., NTN configuration 220) of the cell 210-b (which may be a non-serving cell), the second NTN TRP 205-b, information relating to a virtual cell or reference point associated with the serving cell or non-serving cells, or any combination thereof. The NTN configuration information may enable the UE 115-a to perform uplink transmissions using dynamic sTRP, mTRP, or multi-point reception diversity in the wireless communications system 200.

The network entity 105-a may indicate, in the NTN configuration 220, an NTN configuration of an additional cell (e.g., a non-serving cell), an NTN configuration for an additional TRP, an NTN configuration for a reference point or for a virtual cell, or any combination thereof, that the UE 115-a may use to calculate timing advance values an perform Doppler pre-compensation for NTN mTRP uplink synchronization, where the additional cell is in the same carrier as that of the serving cell. In some examples, the network entity 105-a may indicate the NTN configuration 220 using downlink TCI state information associated with a CORESET configuration (e.g., via CORESETPoolIndex). In some other examples, the network entity 105-a may indicate the NTN configuration 220 using a unified TCI state information message. In some other examples, the network entity 105-a may indicate the NTN configuration 220 using uplink spatial relation information.

In some examples, the network entity 105-a may include the information for the additional NTN configuration for NTN mTRP uplink communications in a downlink TCI state field included in a CORESET message (e.g., in CORESETPoolIndex). For example, two NTN TRPs (e.g., NTN TRP 205-a and NTN TRP 205-b) may have different physical cell identifiers (PCIs), which may be mapped to different coresetPoolIndex values associated with different downlink TCI-states. For example, the CORESET message may include a CORESET identifier and one or more TCI-state identifiers corresponding to the NTN TRPs. The CORESET message may also include a CORESET pool index which includes indices for multiple NTN TRPs. In addition, the CORESET message may include a TCI state field that includes the additional PCI (e.g., additionalPCI-r17) and an additional PCI index (e.g., additionalPCIIndex-r17) for the NTN TRP corresponding to the non-serving cell. Additionally or alternatively, the NTN configuration for the additional cell may be configured using a PDCCH downlink TCI-state. For example, a synchronization signal block (SSB) machine type communication (MTC) message configured for the additional PCI (e.g., SSB-MTC-AdditionalPCI-r17) may include a field (e.g., additionalPCIIndex-r17) that identifies the additional PCI for the additional NTN TRP. In addition, the configuration for the additional NTN TRP may include additional timing information such as timing advance offset information (e.g., n-TimingAdvanceOffset), timing advance group information (e.g., TAG-Id), additional NTN configuration information (e.g., ntn-Config, ntn-Config-r17), or any combination thereof.

In some other examples, the network entity 105-a may include the information for the additional NTN configuration for NTN mTRP uplink communications using a unified TCI-state framework (e.g., including uplink TCI state or joint uplink and downlink TCI state information). For example, the UE 115-a may be configured to measure an SSB from the additional or non-serving cell using the same timing advance as the serving cell for inter-cell beam management. In such examples, the additional PCI (e.g., additional-PCI) for the additional or non-serving cell may be configured to be associated with a downlink or joint TCI state, or an uplink TC state, or both. For a downlink or joint TCI state (e.g., TCI-state) and for an uplink TCI state (e.g., TCI-UL-State-r17) the additional or non-serving cell information may be included as AdditionalPCI and AdditionalPCIIndex information fields. In some examples, the additional PCI and NTN configuration information for the additional or non-serving cell may be included in the SSB-MTC information message associated with the downlink/joint TCI state or the uplink TCI state. In addition, the configuration for the additional NTN TRP may include additional timing information such as timing advance offset information (e.g., n-TimingAdvanceOffset), timing advance group information (e.g., TAG-Id), additional NTN configuration information (e.g., ntn-Config, ntn-Config-r17), or any combination thereof, in the SB-MTC information message.

In some other examples, the network entity 105-a may include the information for the additional NTN configuration for NTN mTRP uplink communications using uplink spatial relation information. In some implementations, sounding reference signal (SRS) positioning for the serving cell or the non-serving cell may be configured via a SRS-SpatialRelationInfoPos, which may be associated with the SSB of the serving cell or non-serving cell, and may further be associated with the CSI-RS of the serving cell. To configure both the serving cell and the non-serving cell for NTN mTRP, the NTN configuration for the additional cell may be configured to be associated with each PUCCH spatial relation or SRS spatial relation using an ssb-InfoNcell. For example, the NTN non-serving cell may be used for SRS positioning, and a SRS spatial relation information message (e.g., SRS-SpatialRelationInfoPos-r16) may include a N-cell information field (e.g., ssb-NCell, SSB-InfoNCell), which may include the NTN mTRP configuration for the additional cell. Additionally or alternatively, the NTN non-serving cell may be used for PUCCH and SRS, and a PUCCH spatial relation information message (e.g., PUCCH-SpatialRelationInfo), a SRS spatial relation information message (e.g., SRS-SpatialRelationInfo) may include a synchronization signal block configuration for neighbor TRP/cell information field (e.g., ssb-NCell, SSB-InfoNCell), which may include the NTN mTRP configuration for the additional cell. In addition, the configuration for the additional NTN TRP may include additional timing information such as timing advance offset information (e.g., n-TimingAdvanceOffset), timing advance group information (e.g., TAG-Id), additional NTN configuration information (e.g., ntn-Config, ntn-Config-r17), or any combination thereof, in the N-cell information field.

The UE 115-a may receive the NTN configuration 220 from the network entity 105-a which may include serving cell and non-serving cell information for the mTRP communications. As described herein, the network entity 105-a may configure the NTN mTRP configuration in a downlink transmission configuration TCI state associated with a CORESET message, using a unified TCI framework message, in an uplink spatial relation info message, or a combination thereof. The UE 115-a may use the NTN mTRP configuration to synchronize communications with the first NTN TRP 205-a and the second NTN TRP 205-b and to effectively perform mTRP communications in the NTN network.

Figure 3:
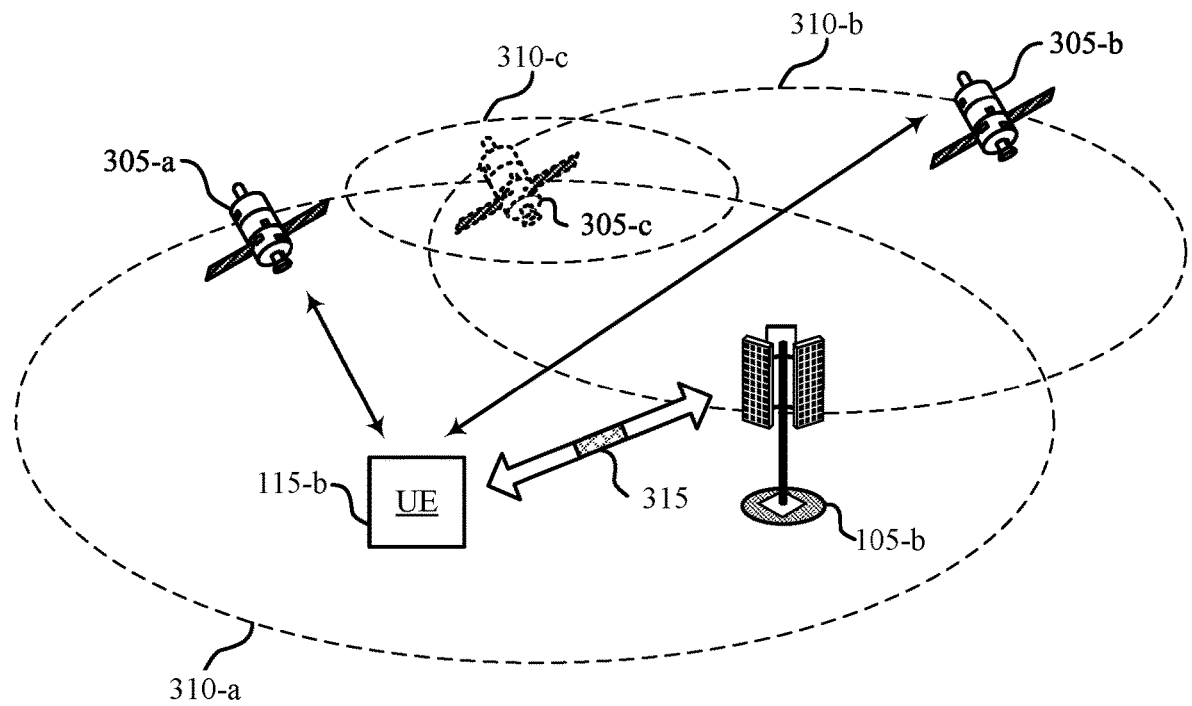

FIG. 3 illustrates an example of a wireless communications system 300 that supports synchronization for mTRP communications in NTNs in accordance with one or more aspects of the present disclosure. For example, FIG. 3 may illustrate communications between a UE 115-b, a network entity 105-b, a first satellite or first NTN TRP 305-a, a second satellite or second NTN TRP 305-b, or any combination thereof. In some examples, the network entity 105-b may be an example or a terrestrial network entity or a non-terrestrial network entity. Additionally or alternatively, the first NTN TRP 305-a and the second NTN TRP 305-b may in some cases be examples of NTN network entities, and may be associated with a first coverage area or first cell 310-a and a second coverage area or a second cell 310-b, respectively. In some examples, the wireless communications system 300 may include a cell 310-c or a TRP 305-c, which may be examples of a virtual cell or a reference point.

To support mTRP communications in the wireless communications system 300, the network entity 105-b may use more than one TRP to communicate with UE 115-b. For example, the UE 115-b may signal, to the network entity 105-b, a capability indication that indicates a quantity of TRPs that the UE 115-b can support using mTRP communications. To effectively communicate with the NTN TRP 205-a and the NTN TRP 205-b (and possibly a quantity of additional NTN TRPs such as NTN TRP 305-c), the UE 115-b may synchronize communications with the first cell 310-a (associated by the first NTN TRP 305-a), and with the second cell 310-b (associated with NTN TRP 305-b), and with cell 310-c (associated with NTN TRP 305-c). For example, the UE 115-b may perform pre-compensation by applying different timing advances to communications received from or sent to the multiple NTN TRPs to account for different Doppler drift and other time and frequency mismatches. In such examples, the UE 115-a may receive information related to both a serving cell (e.g., the first cell 310-a associated with the first NTN TRP 305-a) and additional non-serving cells (e.g., the second cell 310-b associated with NTN TRP 305-b and cell 310-c associated with the third NTN TRP 305-c), which the UE 115-a may use to perform time and frequency pre-compensation for mTRP NTN communications.

In some examples, the network entity 105-b may transmit, to the UE 115-b, an NTN mTRP configuration 315 for mTRP communications (e.g., instead of a single configuration for sTRP). The multiple NTN configurations may include information that the UE 115-b may use to synchronize with and perform mTRP communications with the first NTN TRP 305-a, the NTN TRP 305-b, and the NTN TRP 305-c. For example, the UE may receive configuration information for NTN communications (e.g., NTN mTRP configuration 315) of the second cell 310-b and the cell 310-*c*. The NTN configuration information may enable the UE 115-*b* to perform uplink transmissions in the wireless communications system 300.

In some other examples, the cell 310-*c* may be a virtual cell that the UE 115-*b* may use to perform synchronization for both the first cell 310-*a* and the second cell 310-*b*. For example, the UE 115-*b* may receive an NTN mTRP configuration 315 (which may include a virtual cell ID for the virtual cell 310-*c*), and may synchronize with and transmit communications based on synchronizing with the virtual cell 310-*c* or a reference point that is spatially in between the first NTN TRP 305-*a* and the second NTN TRP 305-*b*. In such cases, the UE 115-*b* may transmit to only the reference point or virtual cell instead of transmitting to both cells, which may reduce overall complexity and signaling overhead. In addition, in some examples, the NTN TRPs (e.g., the first NTN TRP 305-*a* and the second NTN TRP 305-*b*) may receive communications from the UE 115-*b* that has synchronized with the virtual cell 310-*c*, and the NTN TRPs (e.g., the first NTN TRP 305-*a* and the second NTN TRP 305-*b*) may perform post-reception processing to account for possible inaccuracies based on the virtual cell synchronization.

Figure 4:
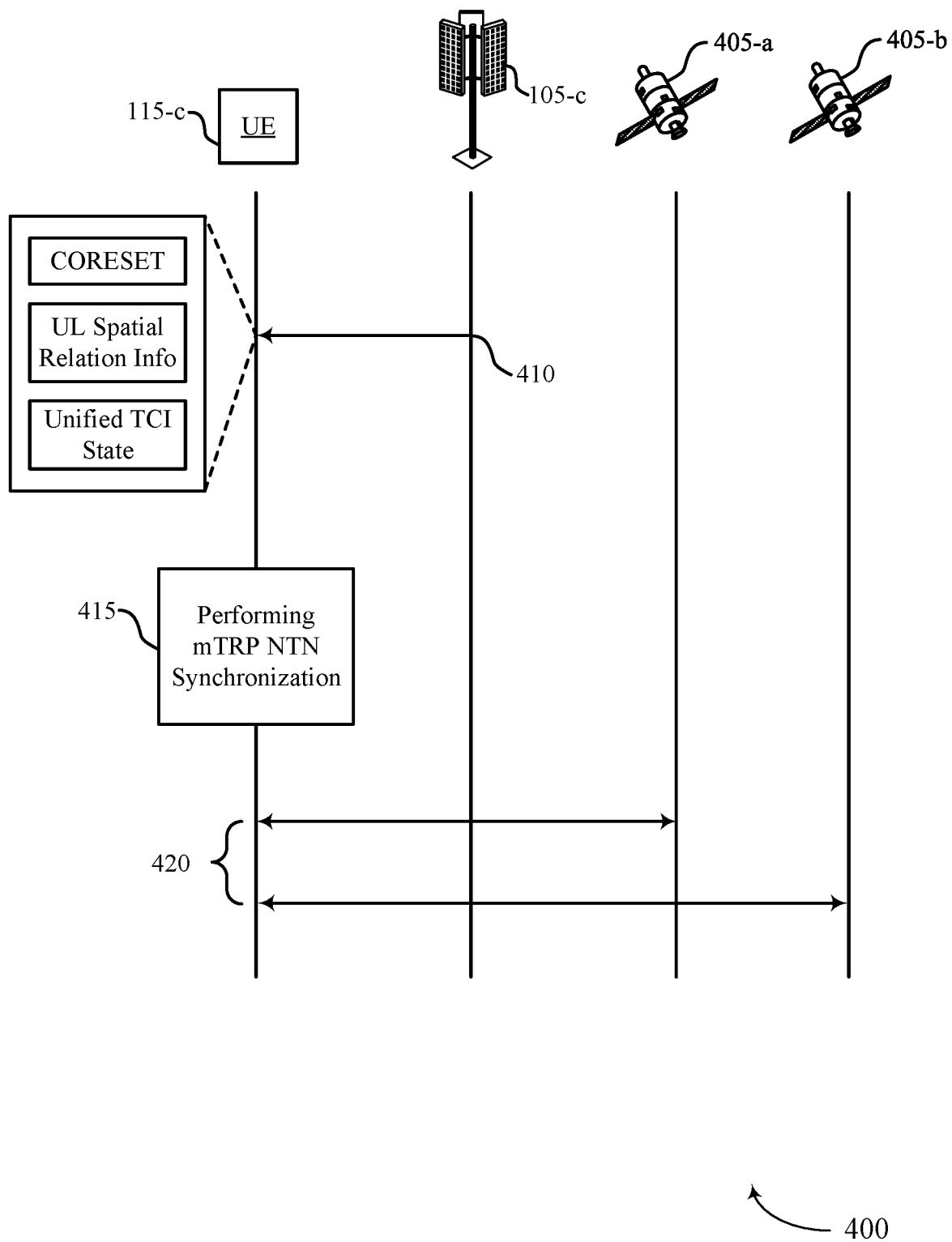
FIG. 4 illustrates an example of a process flow that supports synchronization for mTRP communications in NTNs in accordance with one or more aspects of the present disclosure.

FIG. 4 illustrates an example of a process flow 400 that supports synchronization for mTRP communications in NTNs in accordance with one or more aspects of the present disclosure. For example, the process flow 400 may support communications in a NTN wireless communications network between a UE 115-*c*, a network entity 105-*c*, a first TRP 405-*a* and a second TRP 405-*b*, which may be examples of corresponding devices described herein.

In the following description of process flow 400, the operations between the UE 115-*c*, the network entity 105-*c*, the first TRP 405-*a* and the second TRP 405-*b* may be transmitted in a different order than the order shown, or other operations may be added or removed from the process flow 400. For example, some operations may also be left out of process flow 400, may be performed in different orders or at different times, or other operations may be added to process flow 400. Although UE 115-*c*, network entity 105-*c*, the first TRP 405-*a* and the second TRP 405-*b* are shown performing the operations of process flow 400, some aspects of some operations may also be performed by one or more other wireless or network devices.

At 410, the UE 115-*c* may a downlink message indicating a first configuration for a first TRP (e.g., the first TRP 405-*a*) corresponding to a first cell of an NTN and a second configuration for a second TRP (e.g., the second TRP 405-*b*) corresponding to a second cell of the NTN. For example, the first configuration for the first TRP 405-*a* and the second configuration for the second TRP 405-*b* may include timing information, NTN configuration information, one or more PCID, one or more virtual cell identifiers, or any combination thereof.

In some examples, the downlink message may be a CORESET configuration message, and the UE 115-*c* may receive an indication of the first TRP 405-*a* based on a first CORESET pool index of the CORESET configuration message. The UE 115-*c* may also receive an indication of the second TRP 405-*b* based on a second CORESET pool index of the CORESET configuration message. The UE 115-*c* may then decode the first TCI state information associated with the first CORESET pool index and second TCI state information associated with the second CORESET pool index. In such examples, the first TCI state information may include the first configuration for the first TRP 405-*a* and the second TCI state information may include the second configuration for the second TRP 405-*b*.

In some other examples, the downlink message may be a TCI state information message, and the UE 115-*c* may receive the first configuration for the first TRP 405-*a* and the second configuration for the second TRP 405-*b* based on the unified TCI state information message. In such examples, the unified TCI state information message may include joint downlink and uplink TCI state information, or separate downlink and uplink TCI state information, SSB-MTC information, or any combination thereof.

In some other examples, the downlink message may be a spatial relation information message, and the UE 115-*c* may receive the first configuration for the first TRP 405-*a* and the second configuration for the second TRP 405-*b* based on the spatial relation information message. In some examples, the spatial relation information message comprises a SSB information field corresponding to the first cell, the second cell, or both, that indicates the first configuration for the first TRP 405-*a*, the second configuration for the second TRP 405-*b*, or both. In some other examples, the spatial relation information message may include SRS positioning information corresponding to the first configuration for the first TRP 405-*a* and the second configuration for the second TRP 405-*b*. In addition, the spatial relation information message may include an indication of SRS corresponding to the first configuration for the first TRP 405-*a* and the second configuration for the second TRP 405-*b*. Additionally or alternatively, the spatial relation information message may include an indication of PUCCHs corresponding to the first configuration for the first TRP 405-*a* and the second configuration for the second TRP 405-*b*.

At 415, the UE 115-*c* may perform one or more synchronization measurements (e.g., Doppler shift pre-compensation measurements) for synchronizing uplink communications with the first TRP 405-*a* and the second TRP 405-*b* based on the first configuration and the second configuration of the downlink message. In some examples, the UE 115-*c* may perform the one or more synchronization measurements on one or more SSBs associated with the first cell and the second cell of the NTN by applying respective timing advances for the one or more synchronization measurements.

At 420, the UE 115-*c* may transmit one or more uplink messages to the first TRP 405-*a*, the second TRP 405-*b*, or both, in accordance with the one or more synchronization measurements.

In some examples, the UE 115-*c* may transmit, to the network entity 105-*c*, a message that indicates a capability of the UE 115-*c* to communicate with the first TRP 405-*a*, the second TRP 405-*b*, and one or more additional TRPs in the NTN.

In some other examples, the second configuration may include a configuration for a virtual cell, and the UE 115-*c* may perform the one or more synchronization measurements relative to the virtual cell that is spatially in between the first TRP 405-*a* and the second TRP 405-*b* to synchronize the uplink communications at least partially with the first TRP 405-*a* and the second TRP 405-*b*. The UE 115-*c* may then transmit the one or more uplink messages to the first TRP 405-*a* and the second TRP 405-*b* based on performing the one or more synchronization measurements relative to the virtual cell. In some other examples, the UE 115-*c* may receive a third configuration for a third TRP corresponding to a third cell of the NTN, and may perform the one or more synchronization measurements to synchronize the uplink communications with the first TRP 405-*a*, the second TRP 405-*b*, and the third TRP.

Figure 5:
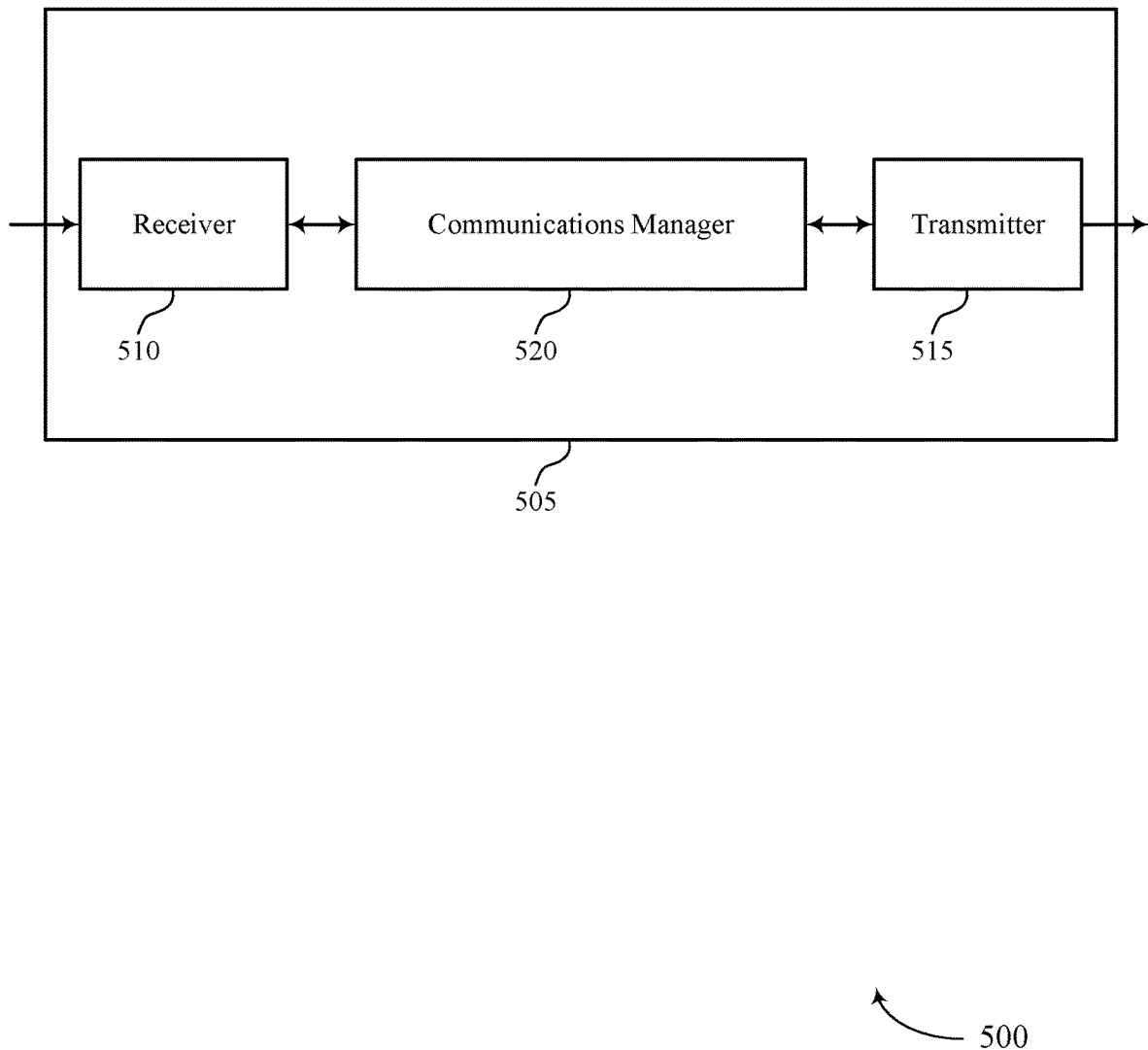
FIGS. 5 and 6 illustrate block diagrams of devices that support synchronization for mTRP communications in NTNs in accordance with one or more aspects of the present disclosure.

FIG. 5 illustrates a block diagram 500 of a device 505 that supports synchronization for mTRP communications in NTNs in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to synchronization for mTRP communications in NTNs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to synchronization for mTRP communications in NTNs). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of synchronization for mTRP communications in NTNs as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving a downlink message indicating a first configuration for a first transmission reception point corresponding to a first cell of a non-terrestrial network and a second configuration for a second transmission reception point corresponding to a second cell of the non-terrestrial network. The communications manager 520 may be configured as or otherwise support a means for performing, based on the first configuration and the second configuration of the downlink message, one or more synchronization measurements for synchronizing uplink communications with the first transmission reception point and the second transmission reception point. The communications manager 520 may be configured as or otherwise support a means for transmitting one or more uplink messages to the first transmission reception point, the second transmission reception point, or both, in accordance with the one or more synchronization measurements.

Figure 6:
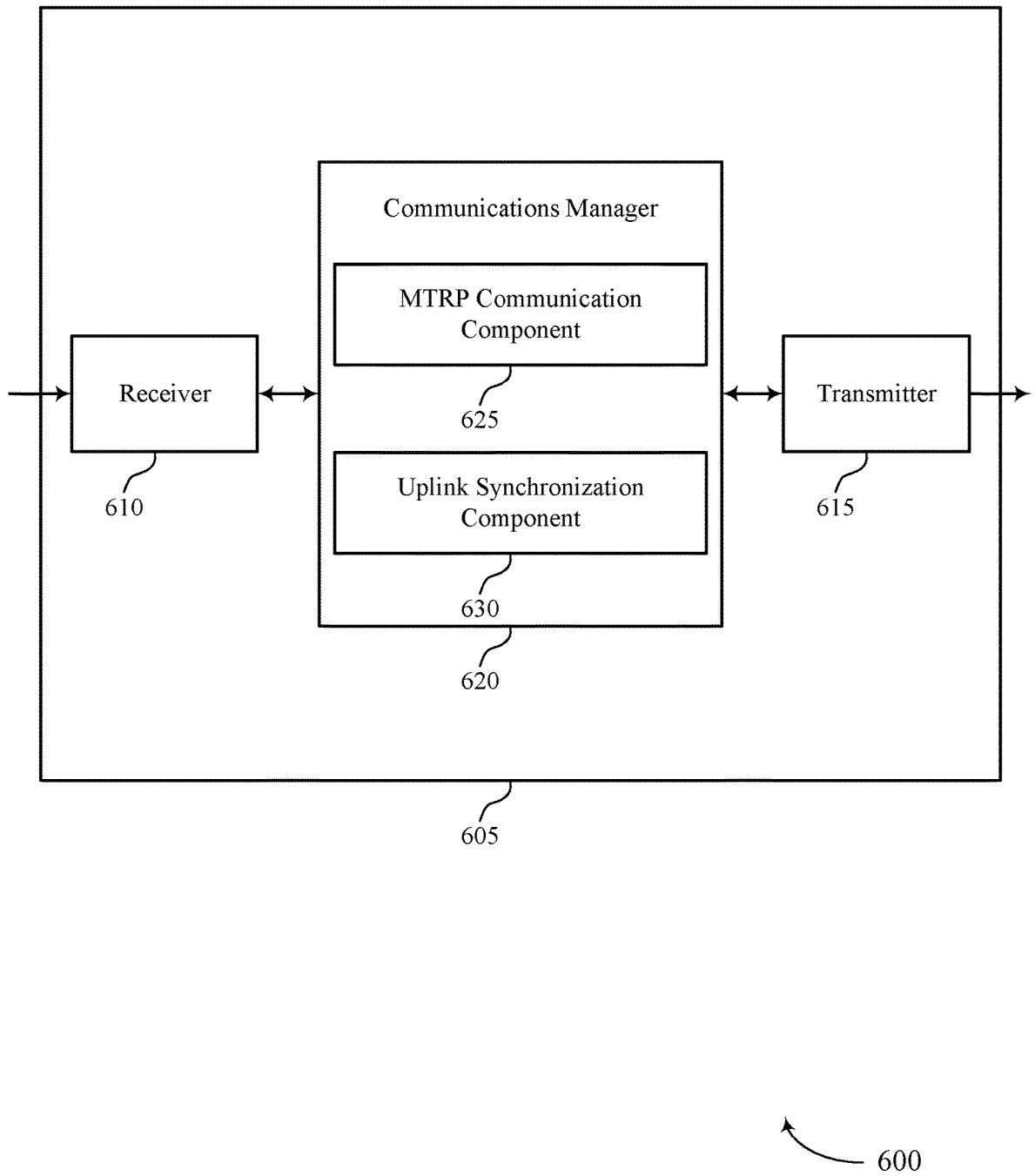

By including or configuring the communications manager 520 in accordance with examples as described herein, the device 505 (e.g., a processor controlling or otherwise coupled with the receiver 510, the transmitter 515, the communications manager 520, or a combination thereof) may support techniques for more efficient utilization of communication resources and increased NTN system capacity and coverage FIG. 6 illustrates a block diagram 600 of a device 605 that supports synchronization for mTRP communications in NTNs in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to synchronization for mTRP communications in NTNs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to synchronization for mTRP communications in NTNs). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of synchronization for mTRP communications in NTNs as described herein. For example, the communications manager 620 may include a mTRP communication component 625 an uplink synchronization component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The mTRP communication component 625 may be configured as or otherwise support a means for receiving a downlink message indicating a first configuration for a first transmission reception point corresponding to a first cell of a non-terrestrial network and a second configuration for a second transmission reception point corresponding to a second cell of the non-terrestrial network. The uplink synchronization component 630 may be configured as or otherwise support a means for performing, based on the first configuration and the second configuration of the downlink message, one or more synchronization measurements for synchronizing uplink communications with the first transmission reception point and the second transmission reception point. The mTRP communication component 625 may be configured as or otherwise support a means for transmitting one or more uplink messages to the first transmission reception point, the second transmission reception point, or both, in accordance with the one or more synchronization measurements.

Figure 7:
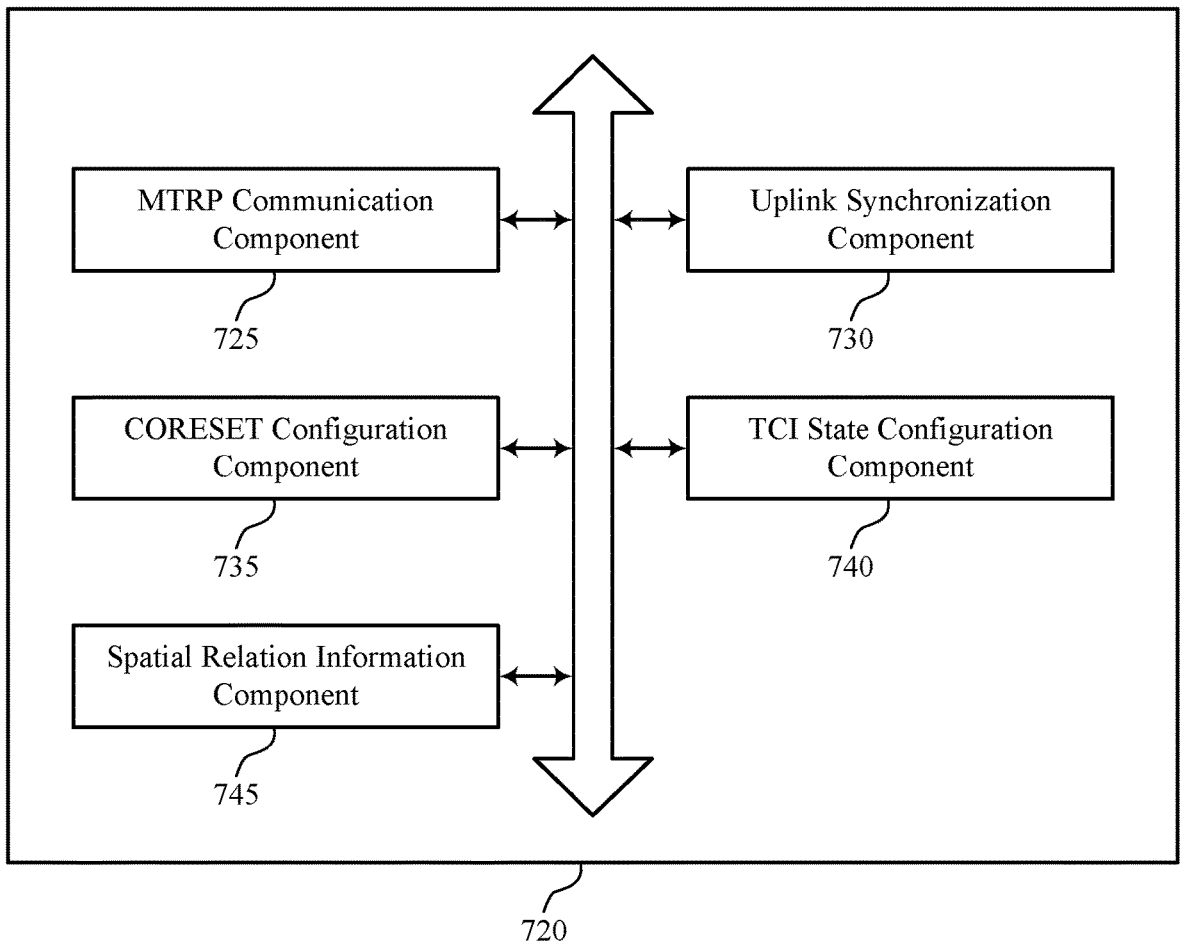
FIG. 7 illustrates a block diagram of a communications manager that supports synchronization for mTRP communications in NTNs in accordance with one or more aspects of the present disclosure.

FIG. 7 illustrates a block diagram 700 of a communications manager 720 that supports synchronization for mTRP communications in NTNs in accordance with one or more aspects of the present disclosure. The communications manager 720 may be an example of aspects of a communications manager 520, a communications manager 620, or both, as described herein. The communications manager 720, or various components thereof, may be an example of means for performing various aspects of synchronization for mTRP communications in NTNs as described herein. For example, the communications manager 720 may include a mTRP communication component 725, an uplink synchronization component 730, a CORESET configuration component 735, a TCI state configuration component 740, a spatial relation information component 745, or any combination thereof. Each of these components may communicate, directly or indirectly, with one another (e.g., via one or more buses).

The communications manager 720 may support wireless communication at a UE in accordance with examples as disclosed herein. The mTRP communication component 725 may be configured as or otherwise support a means for receiving a downlink message indicating a first configuration for a first transmission reception point corresponding to a first cell of a non-terrestrial network and a second configuration for a second transmission reception point corresponding to a second cell of the non-terrestrial network. The uplink synchronization component 730 may be configured as or otherwise support a means for performing, based on the first configuration and the second configuration of the downlink message, one or more synchronization measurements for synchronizing uplink communications with the first transmission reception point and the second transmission reception point. In some examples, the mTRP communication component 725 may be configured as or otherwise support a means for transmitting one or more uplink messages to the first transmission reception point, the second transmission reception point, or both, in accordance with the one or more synchronization measurements.

In some examples, the downlink message includes a control resource set configuration message, and the CORESET configuration component 735 may be configured as or otherwise support a means for receiving an indication of the first transmission reception point based on a first control resource set pool index of the control resource set configuration message and the second transmission reception point based on a second control resource set pool index of the control resource set configuration message.

In some examples, the CORESET configuration component 735 may be configured as or otherwise support a means for decoding first transmission configuration indicator state information associated with the first control resource set pool index and second transmission configuration indicator state information associated with the second control resource set pool index, where the first transmission configuration indicator state information includes the first configuration for the first transmission reception point and the second transmission configuration indicator state information includes the second configuration for the second transmission reception point.

In some examples, the downlink message includes a unified transmission configuration indicator state information message, and the TCI state configuration component 740 may be configured as or otherwise support a means for receiving the first configuration for the first transmission reception point and the second configuration for the second transmission reception point based on the unified transmission configuration indicator state information message.

In some examples, the unified transmission configuration indicator state information message includes joint downlink and uplink transmission configuration indicator state information, or separate downlink and uplink transmission configuration indicator state information, synchronization signal block-machine type communication information, or any combination thereof.

In some examples, the TCI state configuration component 740 may be configured as or otherwise support a means for performing, based on the unified transmission configuration indicator state information message, the one or more synchronization measurements on one or more synchronization signal blocks associated with the first cell and the second cell of the non-terrestrial network by applying respective timing advances for the one or more synchronization measurements.

In some examples, the downlink message includes a spatial relation information message, and the spatial relation information component 745 may be configured as or otherwise support a means for receiving the first configuration for the first transmission reception point and the second configuration for the second transmission reception point based on the spatial relation information message.

In some examples, the spatial relation information message includes a synchronization signal block information field corresponding to the first cell, the second cell, or both, that indicates the first configuration for the first transmission reception point, the second configuration for the second transmission reception point, or both.

In some examples, the spatial relation information message includes sounding reference signal positioning information corresponding to the first configuration for the first transmission reception point and the second configuration for the second transmission reception point.

In some examples, the spatial relation information message includes an indication of sounding reference signals corresponding to the first configuration for the first transmission reception point and the second configuration for the second transmission reception point.

In some examples, the spatial relation information message includes an indication of physical uplink control channels corresponding to the first configuration for the first transmission reception point and the second configuration for the second transmission reception point.

In some examples, the mTRP communication component 725 may be configured as or otherwise support a means for transmitting, to a network entity, a message that indicates a capability of the UE to communicate with the first transmission reception point and the second transmission reception point in the non-terrestrial network.

In some examples, the second configuration includes a configuration of a virtual cell and, to support performing the one or more synchronization measurements, the uplink synchronization component 730 may be configured as or otherwise support a means for performing the one or more synchronization measurements relative to the virtual cell that is spatially in between the first transmission reception point and the second transmission reception point to synchronize the uplink communications at least partially with the first transmission reception point and the second transmission reception point. In some examples, the second configuration includes a configuration of a virtual cell and, to support performing the one or more synchronization measurements, the mTRP communication component 725 may be configured as or otherwise support a means for transmitting the one or more uplink messages to the first transmission reception point and the second transmission reception point based on performing the one or more synchronization measurements relative to the virtual cell.

In some examples, to support receiving the downlink message, the mTRP communication component 725 may be configured as or otherwise support a means for receiving a third configuration for a third transmission reception point corresponding to a third cell of the non-terrestrial network. In some examples, to support receiving the downlink message, the uplink synchronization component 730 may be configured as or otherwise support a means for performing, based on the third configuration, the one or more synchronization measurements to synchronize the uplink communications with the first transmission reception point, the second transmission reception point, and the third transmission reception point.

In some examples, the first configuration for the first transmission reception point and the second configuration for the second transmission reception point include timing information, non-terrestrial network configuration information, a physical cell identifier, a virtual cell identifier, or any combination thereof.

In some examples, the one or more synchronization measurements include Doppler shift pre-compensation measurements associated with the first transmission reception point and the second transmission reception point in the non-terrestrial network.

In some examples, the first configuration for the first transmission reception point includes a first physical cell identifier or a first virtual cell identifier, and the second configuration for the second transmission reception point includes a second physical cell identifier or a second virtual cell identifier.

Figure 8:
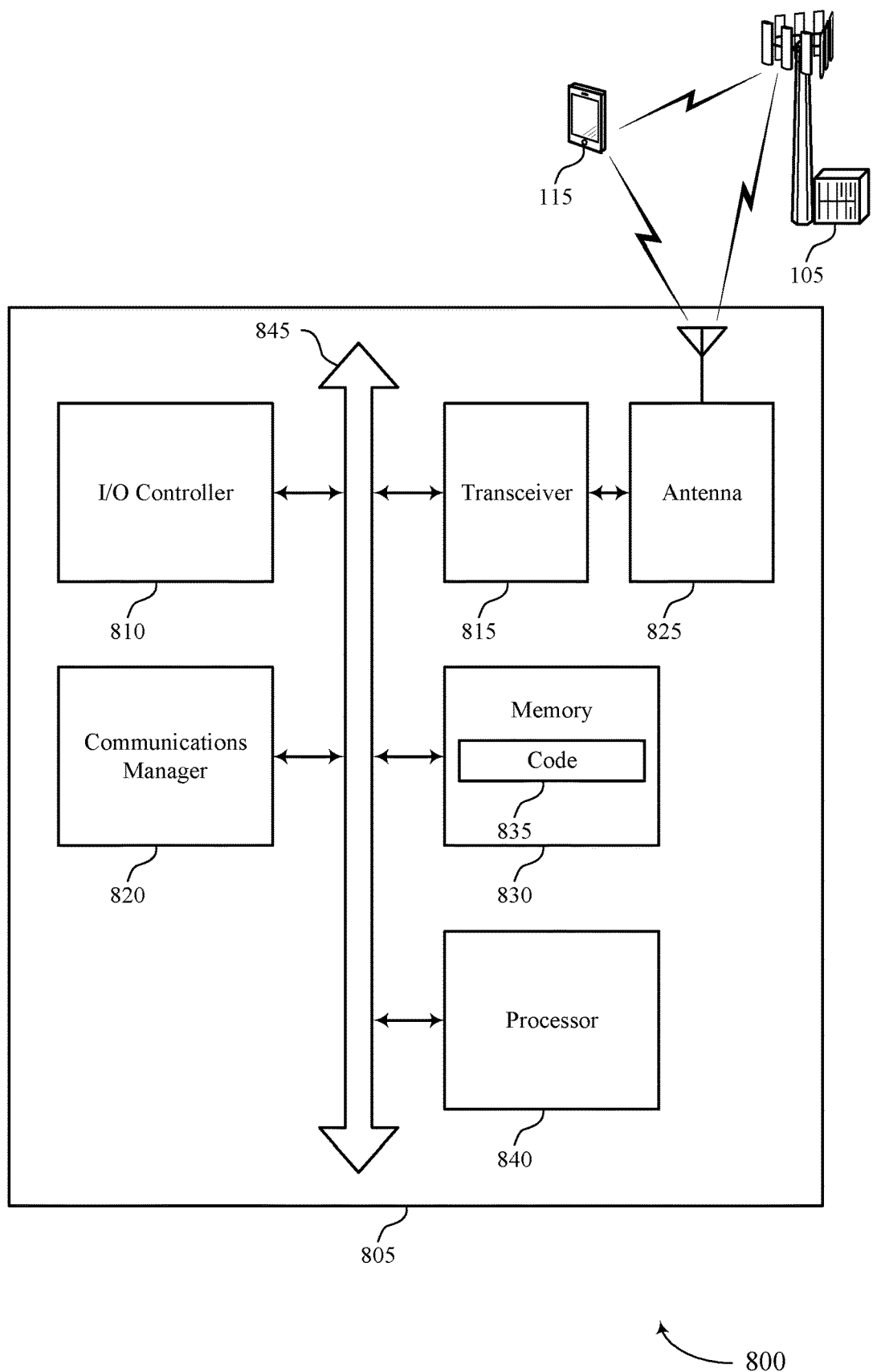
FIG. 8 illustrates a diagram of a system including a device that supports synchronization for mTRP communications in NTNs in accordance with one or more aspects of the present disclosure.

FIG. 8 illustrates a diagram of a system 800 including a device 805 that supports synchronization for mTRP communications in NTNs in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting synchronization for mTRP communications in NTNs). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving a downlink message indicating a first configuration for a first transmission reception point corresponding to a first cell of a non-terrestrial network and a second configuration for a second transmission reception point corresponding to a second cell of the non-terrestrial network. The communications manager 820 may be configured as or otherwise support a means for performing, based on the first configuration and the second configuration of the downlink message, one or more synchronization measurements for synchronizing uplink communications with the first transmission reception point and the second transmission reception point. The communications manager 820 may be configured as or otherwise support a means for transmitting one or more uplink messages to the first transmission reception point, the second transmission reception point, or both, in accordance with the one or more synchronization measurements.

By including or configuring the communications manager 820 in accordance with examples as described herein, the device 805 may support techniques for improved communication reliability, reduced latency, more efficient utilization of communication resources, improved coordination between devices, and increased NTN system capacity and coverage.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of synchronization for mTRP communications in NTNs as described herein, or the processor 840 and the memory 830 may be otherwise configured to perform or support such operations.

Figure 9:
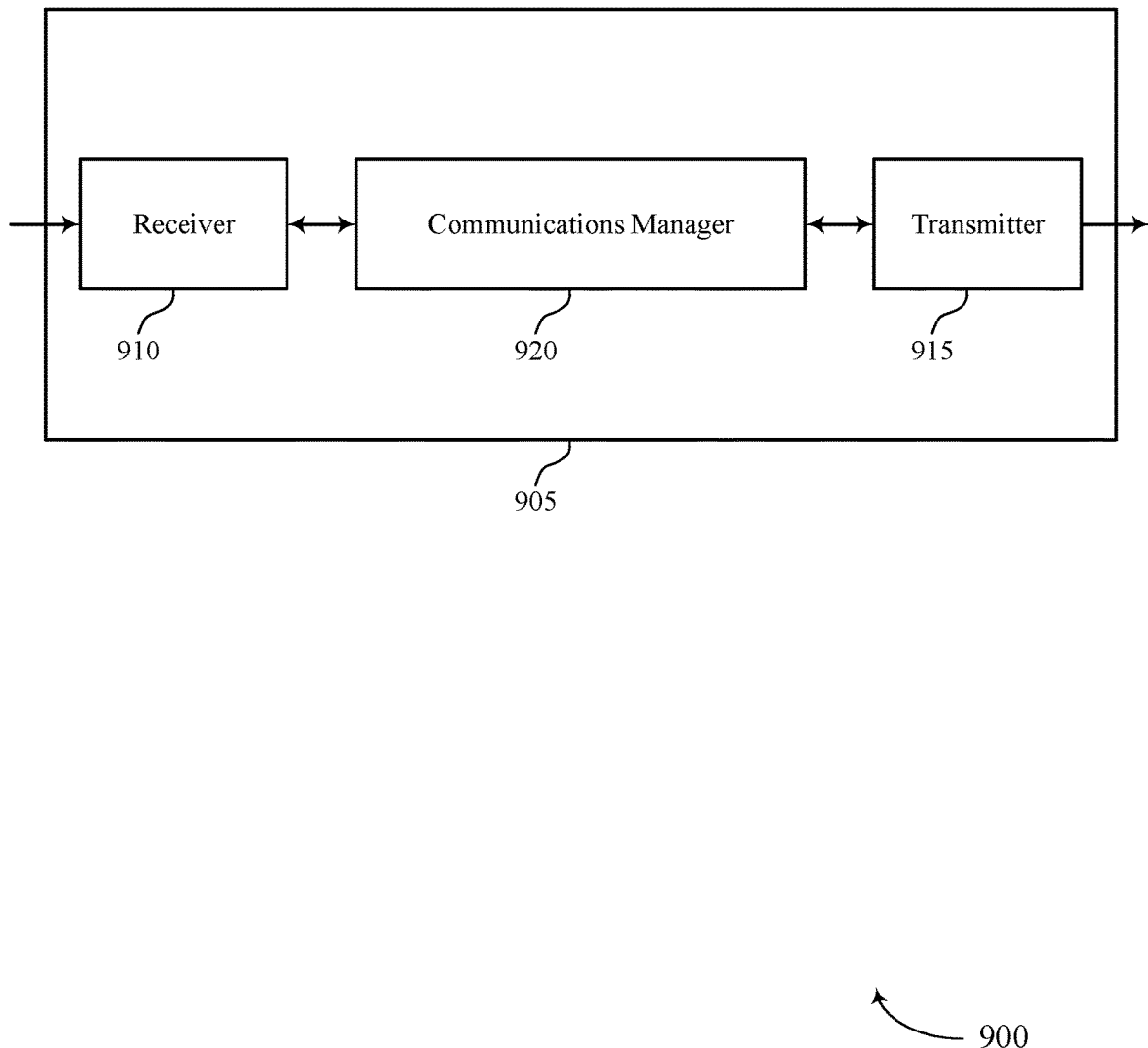
FIGS. 9 and 10 illustrate block diagrams of devices that support synchronization for mTRP communications in NTNs in accordance with one or more aspects of the present disclosure.

FIG. 9 illustrates a block diagram 900 of a device 905 that supports synchronization for mTRP communications in NTNs in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of synchronization for mTRP communications in NTNs as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for transmitting, to a UE a downlink message indicating a first configuration for a first transmission reception point corresponding to a first cell of a non-terrestrial network and a second configuration for a second transmission reception point corresponding to a second cell of the non-terrestrial network. The communications manager 920 may be configured as or otherwise support a means for performing, based on the first configuration and the second configuration of the downlink message, one or more synchronization measurements for synchronizing communications with the first transmission reception point, the second transmission reception point, and the UE. The communications manager 920 may be configured as or otherwise support a means for receiving one or more uplink messages from the UE in accordance with the one or more synchronization measurements.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for more efficient utilization of communication resources and increased NTN system capacity and coverage.

Figure 10:
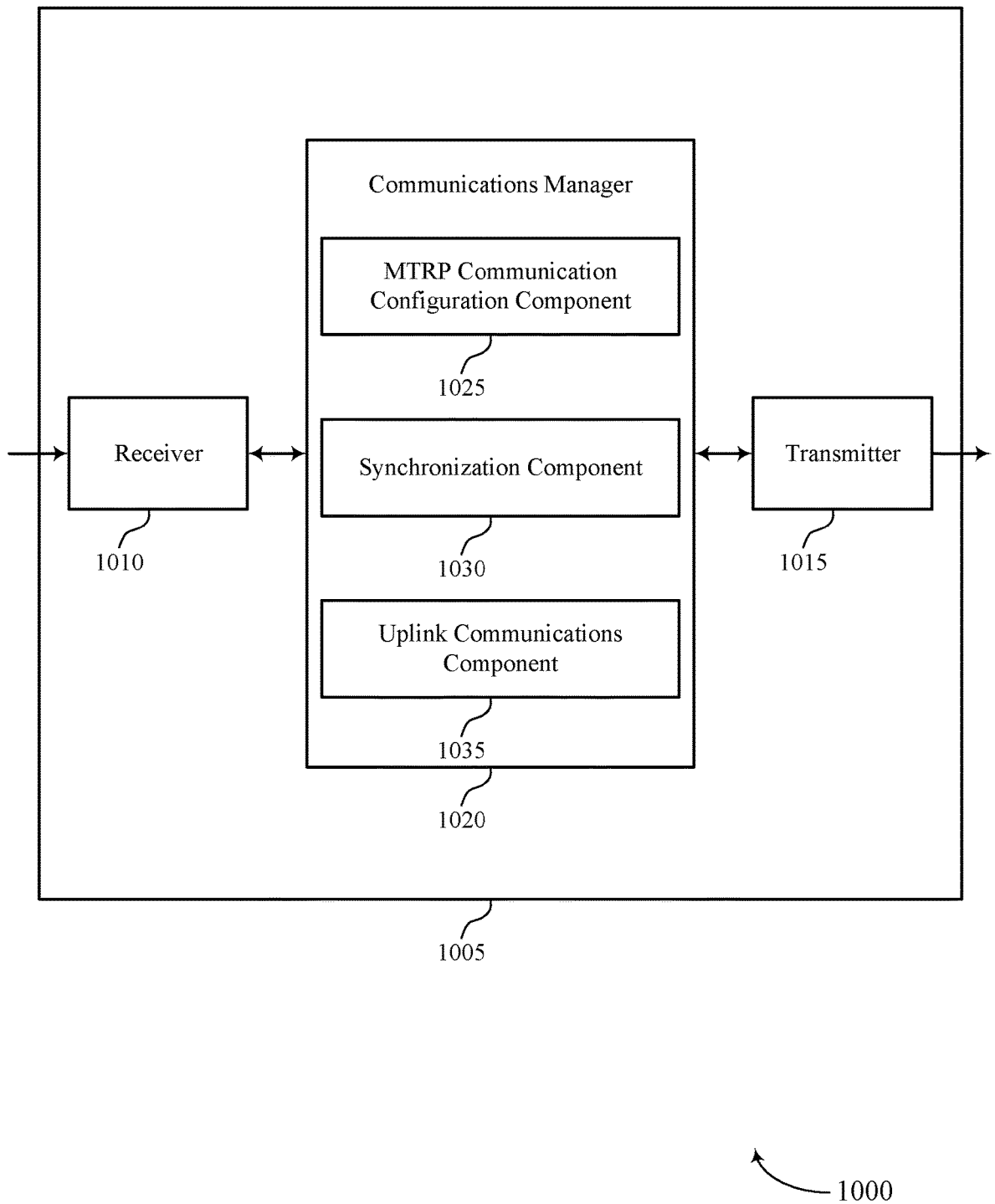

FIG. 10 illustrates a block diagram 1000 of a device 1005 that supports synchronization for mTRP communications in NTNs in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., U/I samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., U/I samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of synchronization for mTRP communications in NTNs as described herein. For example, the communications manager 1020 may include a mTRP communication configuration component 1025, a synchronization component 1030, an uplink communications component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The mTRP communication configuration component 1025 may be configured as or otherwise support a means for transmitting, to a UE a downlink message indicating a first configuration for a first transmission reception point corresponding to a first cell of a non-terrestrial network and a second configuration for a second transmission reception point corresponding to a second cell of the non-terrestrial network. The synchronization component 1030 may be configured as or otherwise support a means for performing, based on the first configuration and the second configuration of the downlink message, one or more synchronization measurements for synchronizing communications with the first transmission reception point, the second transmission reception point, and the UE. The uplink communications component 1035 may be configured as or otherwise support a means for receiving one or more uplink messages from the UE in accordance with the one or more synchronization measurements.

Figure 11:
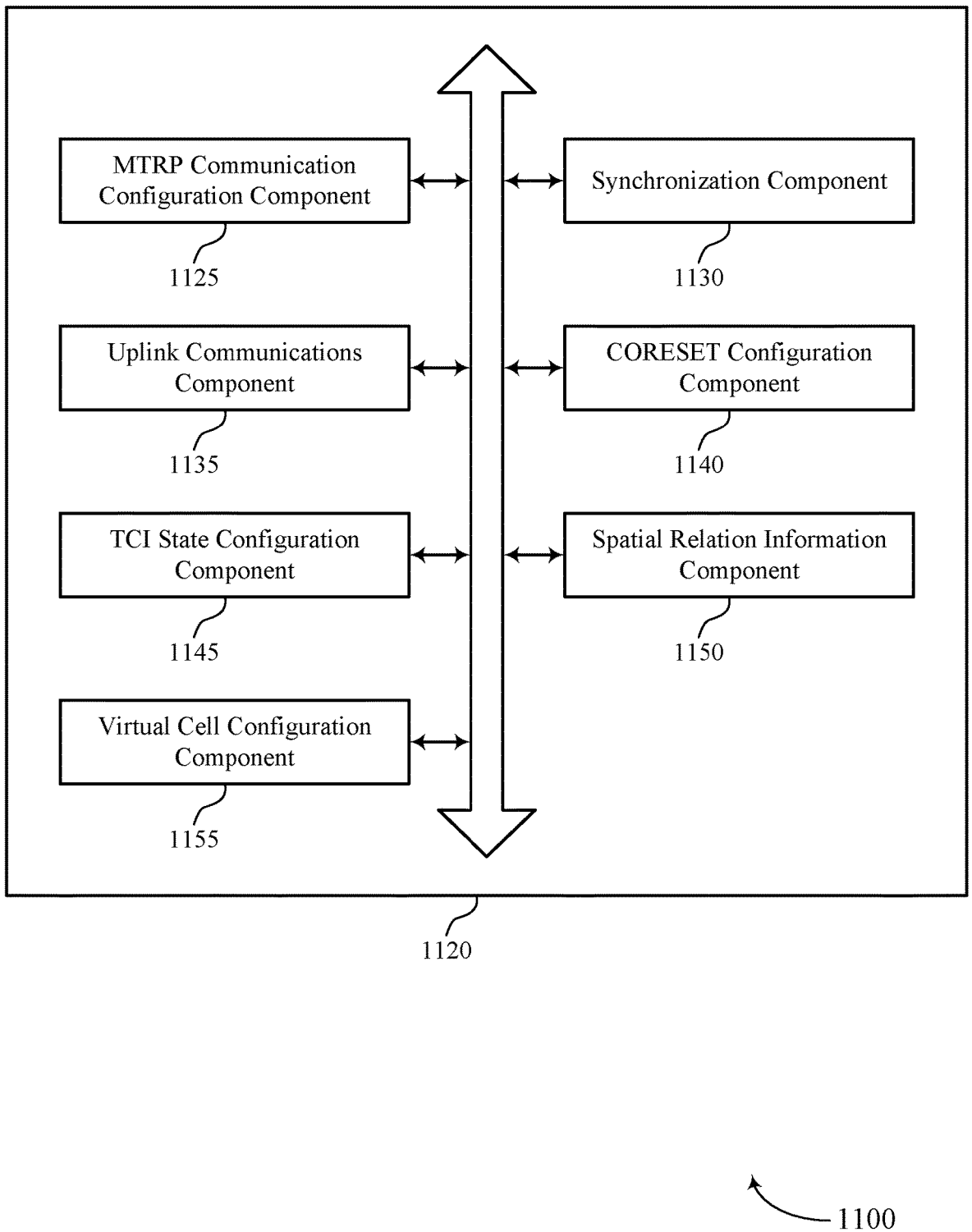
FIG. 11 illustrates a block diagram of a communications manager that supports synchronization for mTRP communications in NTNs in accordance with one or more aspects of the present disclosure.

FIG. 11 illustrates a block diagram 1100 of a communications manager 1120 that supports synchronization for mTRP communications in NTNs in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of synchronization for mTRP communications in NTNs as described herein. For example, the communications manager 1120 may include a mTRP communication configuration component 1125, a synchronization component 1130, an uplink communications component 1135, a CORESET configuration component 1140, a TCI state configuration component 1145, a spatial relation information component 1150, a virtual cell configuration component 1155, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The mTRP communication configuration component 1125 may be configured as or otherwise support a means for transmitting, to a UE a downlink message indicating a first configuration for a first transmission reception point corresponding to a first cell of a non-terrestrial network and a second configuration for a second transmission reception point corresponding to a second cell of the non-terrestrial network. The synchronization component 1130 may be configured as or otherwise support a means for performing, based on the first configuration and the second configuration of the downlink message, one or more synchronization measurements for synchronizing communications with the first transmission reception point, the second transmission reception point, and the UE. The uplink communications component 1135 may be configured as or otherwise support a means for receiving one or more uplink messages from the UE in accordance with the one or more synchronization measurements.

In some examples, the downlink message includes a control resource set configuration message, and the CORESET configuration component 1140 may be configured as or otherwise support a means for transmitting, to the UE, an indication of the first transmission reception point based on a first control resource set pool index of the control resource set configuration message and the second transmission reception point based on a second control resource set pool index of the control resource set configuration message.

In some examples, the downlink message further includes first transmission configuration indicator state information associated with the first control resource set pool index and second transmission configuration indicator state information associated with the second control resource set pool index. In some examples, the first transmission configuration indicator state information includes the first configuration for the first transmission reception point and the second transmission configuration indicator state information includes the second configuration for the second transmission reception point.

In some examples, the downlink message includes a unified transmission configuration indicator state information message, and the TCI state configuration component 1145 may be configured as or otherwise support a means for transmitting, to the UE, the first configuration for the first transmission reception point and the second configuration for the second transmission reception point based on the unified transmission configuration indicator state information message.

In some examples, the unified transmission configuration indicator state information message includes joint downlink and uplink transmission configuration indicator state information, or separate downlink and uplink transmission configuration indicator state information, synchronization signal block-machine type communication information, or a combination thereof.

In some examples, the downlink message includes a spatial relation information message, and the spatial relation information component 1150 may be configured as or otherwise support a means for transmitting, to the UE, the first configuration for the first transmission reception point and the second configuration for the second transmission reception point based on the spatial relation information message.

In some examples, the spatial relation information message includes a synchronization signal block information field corresponding to the first cell, the second cell, or both, that indicates the first configuration for the first transmission reception point, the second configuration for the second transmission reception point, or both.

In some examples, the spatial relation information message includes sounding reference signal positioning information corresponding to the first configuration for the first transmission reception point and the second configuration for the second transmission reception point.

In some examples, the mTRP communication configuration component 1125 may be configured as or otherwise support a means for receiving a message that indicates a capability of the UE to communicate with the first transmission reception point and the second transmission reception point in the non-terrestrial network.

In some examples, the second configuration includes a configuration of a virtual cell, and the virtual cell configuration component 1155 may be configured as or otherwise support a means for receiving, from the UE, the one or more uplink messages synchronized to the virtual cell. In some examples, the second configuration includes a configuration of a virtual cell, and the synchronization component 1130 may be configured as or otherwise support a means for performing one or more post-processing procedures to synchronize the one or more uplink messages to timings of the first cell and the second cell.

In some examples, to support receiving the downlink message, the mTRP communication configuration component 1125 may be configured as or otherwise support a means for transmitting a third configuration for a third transmission reception point corresponding to a third cell of the non-terrestrial network. In some examples, to support receiving the downlink message, the synchronization component 1130 may be configured as or otherwise support a means for performing, based on the third configuration, the one or more synchronization measurements to synchronize the communications with the first transmission reception point, the second transmission reception point, the third transmission reception point, and the UE.

Figure 12:
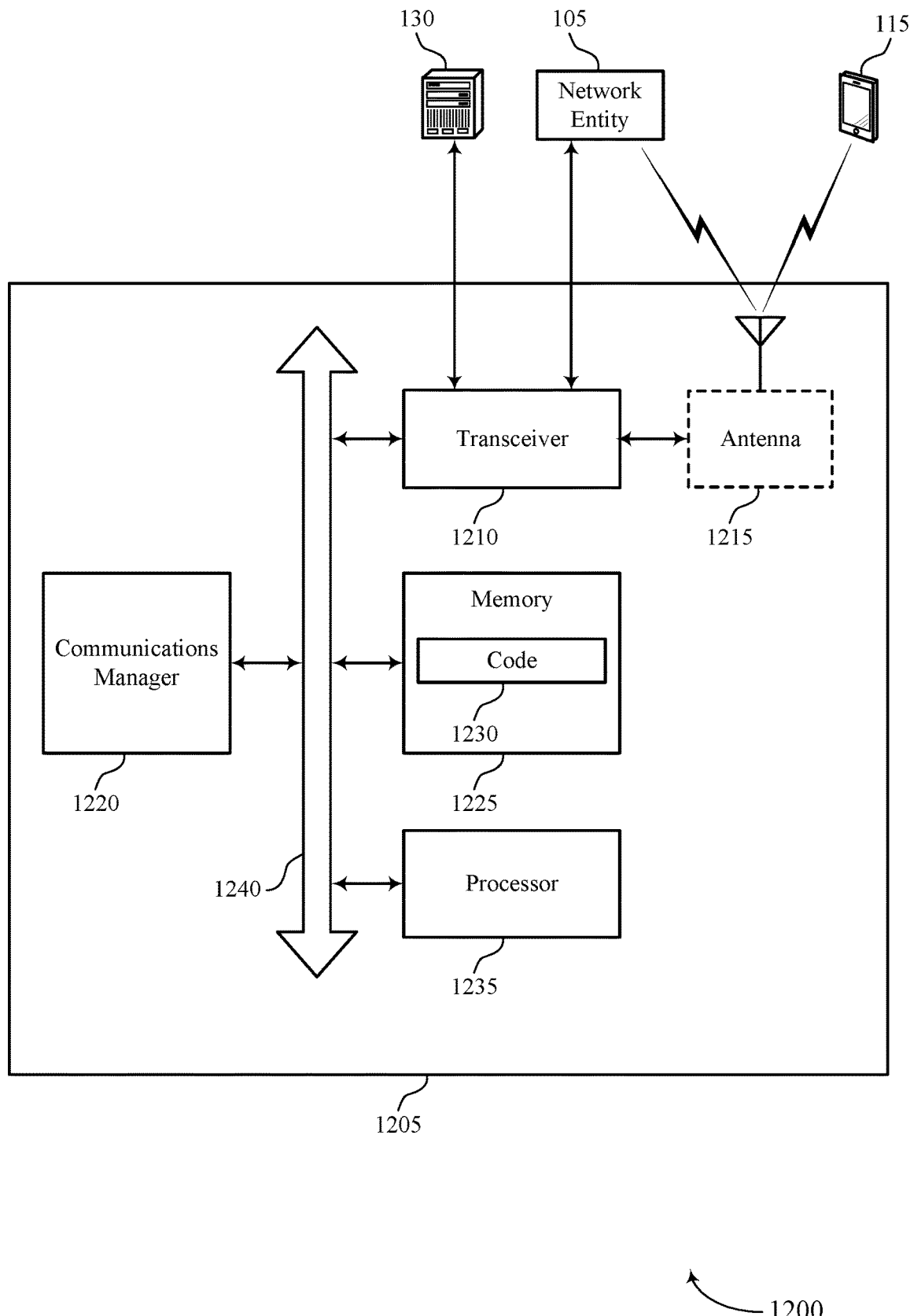
FIG. 12 illustrates a diagram of a system including a device that supports synchronization for mTRP communications in NTNs in accordance with one or more aspects of the present disclosure.

FIG. 12 illustrates a diagram of a system 1200 including a device 1205 that supports synchronization for mTRP communications in NTNs in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting synchronization for mTRP communications in NTNs). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting, to a UE a downlink message indicating a first configuration for a first transmission reception point corresponding to a first cell of a non-terrestrial network and a second configuration for a second transmission reception point corresponding to a second cell of the non-terrestrial network. The communications manager 1220 may be configured as or otherwise support a means for performing, based on the first configuration and the second configuration of the downlink message, one or more synchronization measurements for synchronizing communications with the first transmission reception point, the second transmission reception point, and the UE. The communications manager 1220 may be configured as or otherwise support a means for receiving one or more uplink messages from the UE in accordance with the one or more synchronization measurements.

By including or configuring the communications manager 1220 in accordance with examples as described herein, the device 1205 may support techniques for improved communication reliability, reduced latency, more efficient utilization of communication resources, improved coordination between devices, and increased NTN system capacity and coverage.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of synchronization for mTRP communications in NTNs as described herein, or the processor 1235 and the memory 1225 may be otherwise configured to perform or support such operations.

Figure 13:
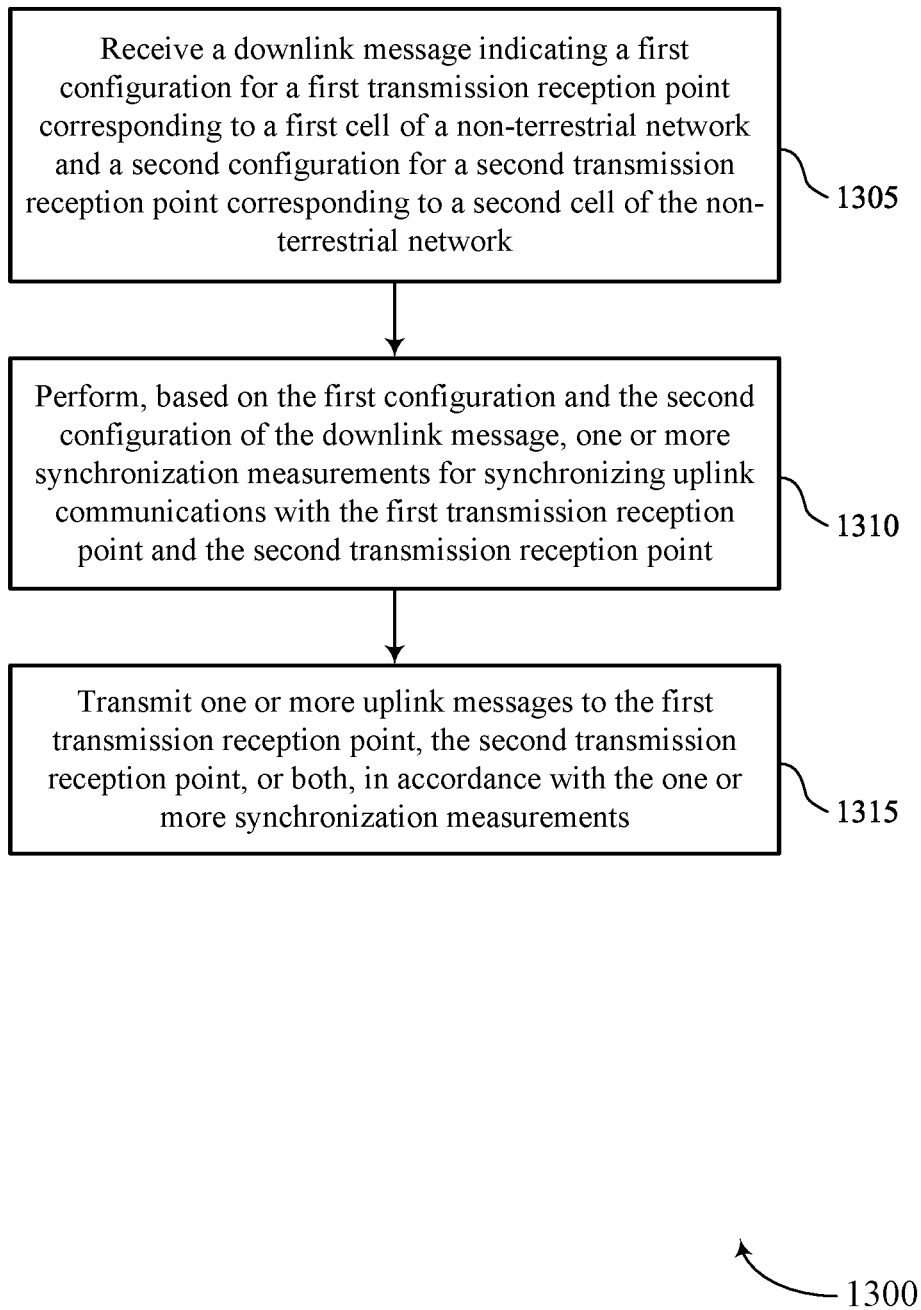
FIGS. 13 through 17 illustrate flowcharts showing methods that support synchronization for mTRP communications in NTNs in accordance with one or more aspects of the present disclosure.

FIG. 13 illustrates a flowchart illustrating a method 1300 that supports synchronization for mTRP communications in NTNs in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving a downlink message indicating a first configuration for a first transmission reception point corresponding to a first cell of a non-terrestrial network and a second configuration for a second transmission reception point corresponding to a second cell of the non-terrestrial network. The operations of 1305 may be performed in accordance with examples as disclosed herein. In some examples, aspects of the operations of 1305 may be performed by a mTRP communication component 725 as described with reference to FIG. 7.

At 1310, the method may include performing, based on the first configuration and the second configuration of the downlink message, one or more synchronization measurements for synchronizing uplink communications with the first transmission reception point and the second transmission reception point. The operations of 1310 may be performed in accordance with examples as disclosed herein. In some examples, aspects of the operations of 1310 may be performed by an uplink synchronization component 730 as described with reference to FIG. 7.

At 1315, the method may include transmitting one or more uplink messages to the first transmission reception point, the second transmission reception point, or both, in accordance with the one or more synchronization measurements. The operations of 1315 may be performed in accordance with examples as disclosed herein. In some examples, aspects of the operations of 1315 may be performed by a mTRP communication component 725 as described with reference to FIG. 7.

Figure 14:
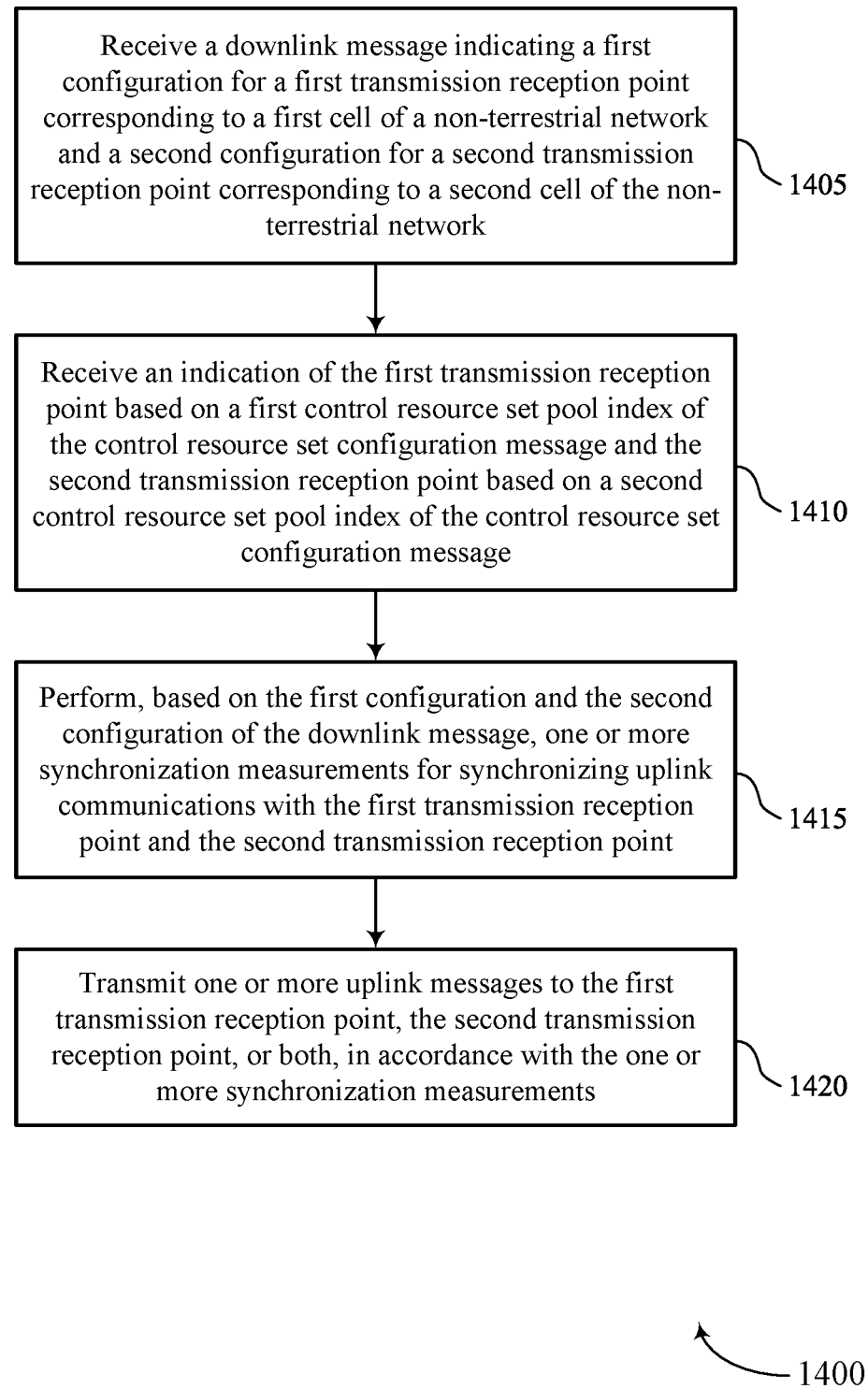

FIG. 14 illustrates a flowchart illustrating a method 1400 that supports synchronization for mTRP communications in NTNs in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving a downlink message indicating a first configuration for a first transmission reception point corresponding to a first cell of a non-terrestrial network and a second configuration for a second transmission reception point corresponding to a second cell of the non-terrestrial network. The operations of 1405 may be performed in accordance with examples as disclosed herein. In some examples, aspects of the operations of 1405 may be performed by a mTRP communication component 725 as described with reference to FIG. 7.

At 1410, the method may include receiving an indication of the first transmission reception point based on a first control resource set pool index of the control resource set configuration message and the second transmission reception point based on a second control resource set pool index of the control resource set configuration message. The operations of 1410 may be performed in accordance with examples as disclosed herein. In some examples, aspects of the operations of 1410 may be performed by a CORESET configuration component 735 as described with reference to FIG. 7.

At 1415, the method may include performing, based on the first configuration and the second configuration of the downlink message, one or more synchronization measurements for synchronizing uplink communications with the first transmission reception point and the second transmission reception point. The operations of 1415 may be performed in accordance with examples as disclosed herein. In some examples, aspects of the operations of 1415 may be performed by an uplink synchronization component 730 as described with reference to FIG. 7.

At 1420, the method may include transmitting one or more uplink messages to the first transmission reception point, the second transmission reception point, or both, in accordance with the one or more synchronization measurements. The operations of 1420 may be performed in accordance with examples as disclosed herein. In some examples, aspects of the operations of 1420 may be performed by a mTRP communication component 725 as described with reference to FIG. 7.

Figure 15:
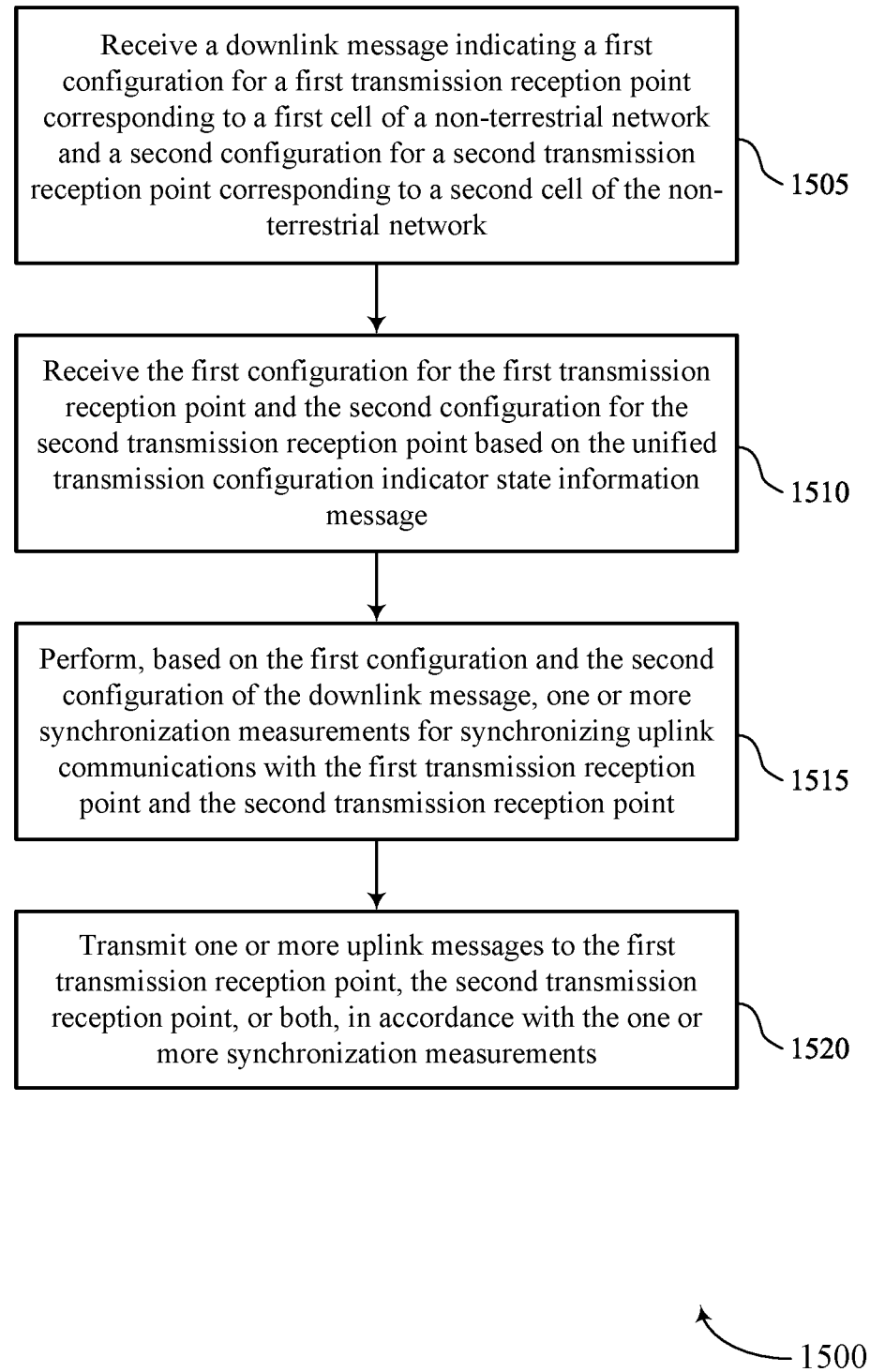

FIG. 15 illustrates a flowchart illustrating a method 1500 that supports synchronization for mTRP communications in NTNs in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving a downlink message indicating a first configuration for a first transmission reception point corresponding to a first cell of a non-terrestrial network and a second configuration for a second transmission reception point corresponding to a second cell of the non-terrestrial network. The operations of 1505 may be performed in accordance with examples as disclosed herein. In some examples, aspects of the operations of 1505 may be performed by a mTRP communication component 725 as described with reference to FIG. 7.

At 1510, the method may include receiving the first configuration for the first transmission reception point and the second configuration for the second transmission reception point based on the unified transmission configuration indicator state information message. The operations of 1510 may be performed in accordance with examples as disclosed herein. In some examples, aspects of the operations of 1510 may be performed by a TCI state configuration component 740 as described with reference to FIG. 7.

At 1515, the method may include performing, based on the first configuration and the second configuration of the downlink message, one or more synchronization measurements for synchronizing uplink communications with the first transmission reception point and the second transmission reception point. The operations of 1515 may be performed in accordance with examples as disclosed herein. In some examples, aspects of the operations of 1515 may be performed by an uplink synchronization component 730 as described with reference to FIG. 7.

At 1520, the method may include transmitting one or more uplink messages to the first transmission reception point, the second transmission reception point, or both, in accordance with the one or more synchronization measurements. The operations of 1520 may be performed in accordance with examples as disclosed herein. In some examples, aspects of the operations of 1520 may be performed by a mTRP communication component 725 as described with reference to FIG. 7.

Figure 16:
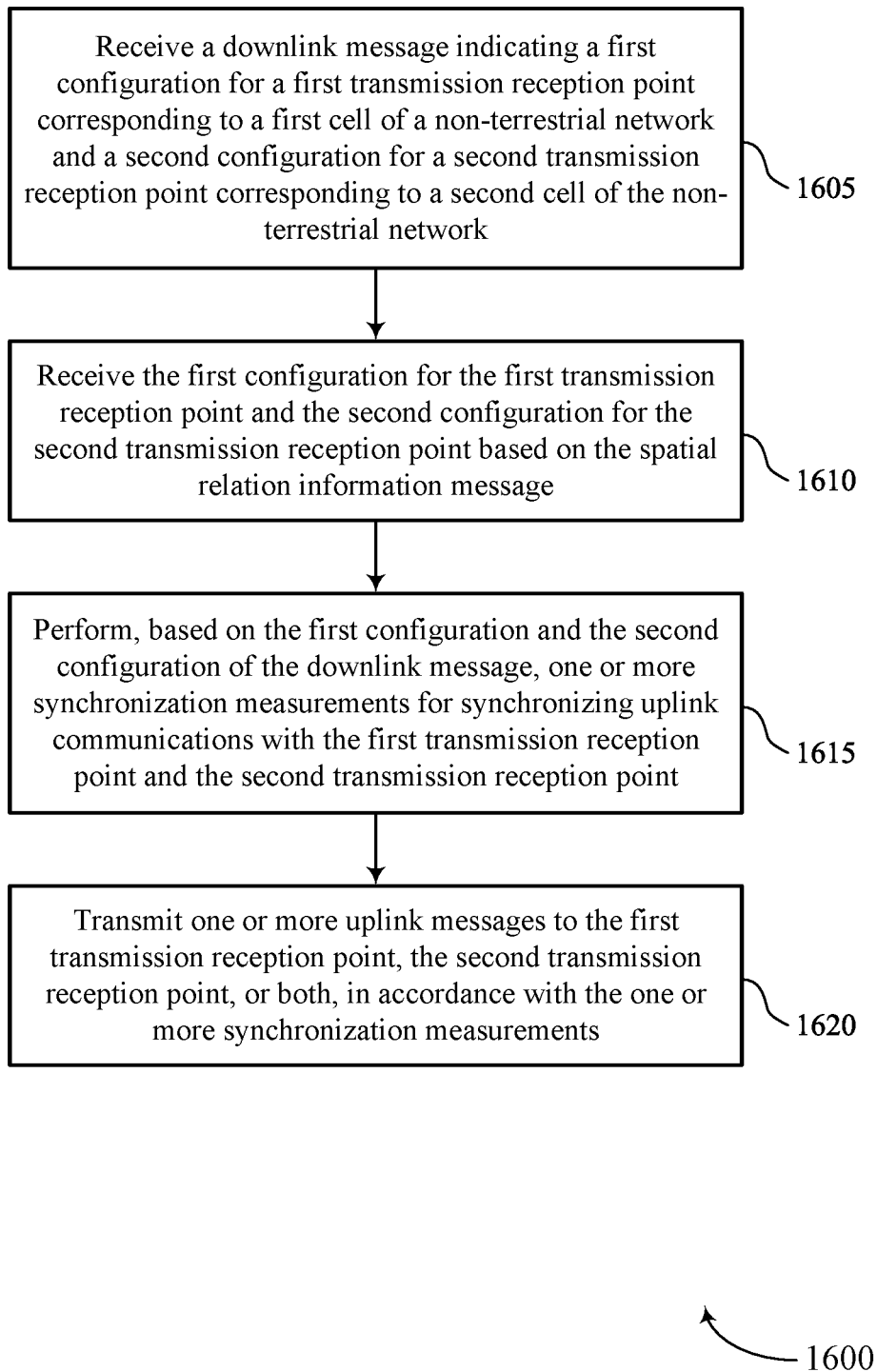

FIG. 16 illustrates a flowchart illustrating a method 1600 that supports synchronization for mTRP communications in NTNs in accordance with one or more aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1605, the method may include receiving a downlink message indicating a first configuration for a first transmission reception point corresponding to a first cell of a non-terrestrial network and a second configuration for a second transmission reception point corresponding to a second cell of the non-terrestrial network. The operations of 1605 may be performed in accordance with examples as disclosed herein. In some examples, aspects of the operations of 1605 may be performed by a mTRP communication component 725 as described with reference to FIG. 7.

At 1610, the method may include receiving the first configuration for the first transmission reception point and the second configuration for the second transmission reception point based on the spatial relation information message. The operations of 1610 may be performed in accordance with examples as disclosed herein. In some examples, aspects of the operations of 1610 may be performed by a spatial relation information component 745 as described with reference to FIG. 7.

At 1615, the method may include performing, based on the first configuration and the second configuration of the downlink message, one or more synchronization measurements for synchronizing uplink communications with the first transmission reception point and the second transmission reception point. The operations of 1615 may be performed in accordance with examples as disclosed herein. In some examples, aspects of the operations of 1615 may be performed by an uplink synchronization component 730 as described with reference to FIG. 7.

At 1620, the method may include transmitting one or more uplink messages to the first transmission reception point, the second transmission reception point, or both, in accordance with the one or more synchronization measurements. The operations of 1620 may be performed in accordance with examples as disclosed herein. In some examples, aspects of the operations of 1620 may be performed by a mTRP communication component 725 as described with reference to FIG. 7.

Figure 17:
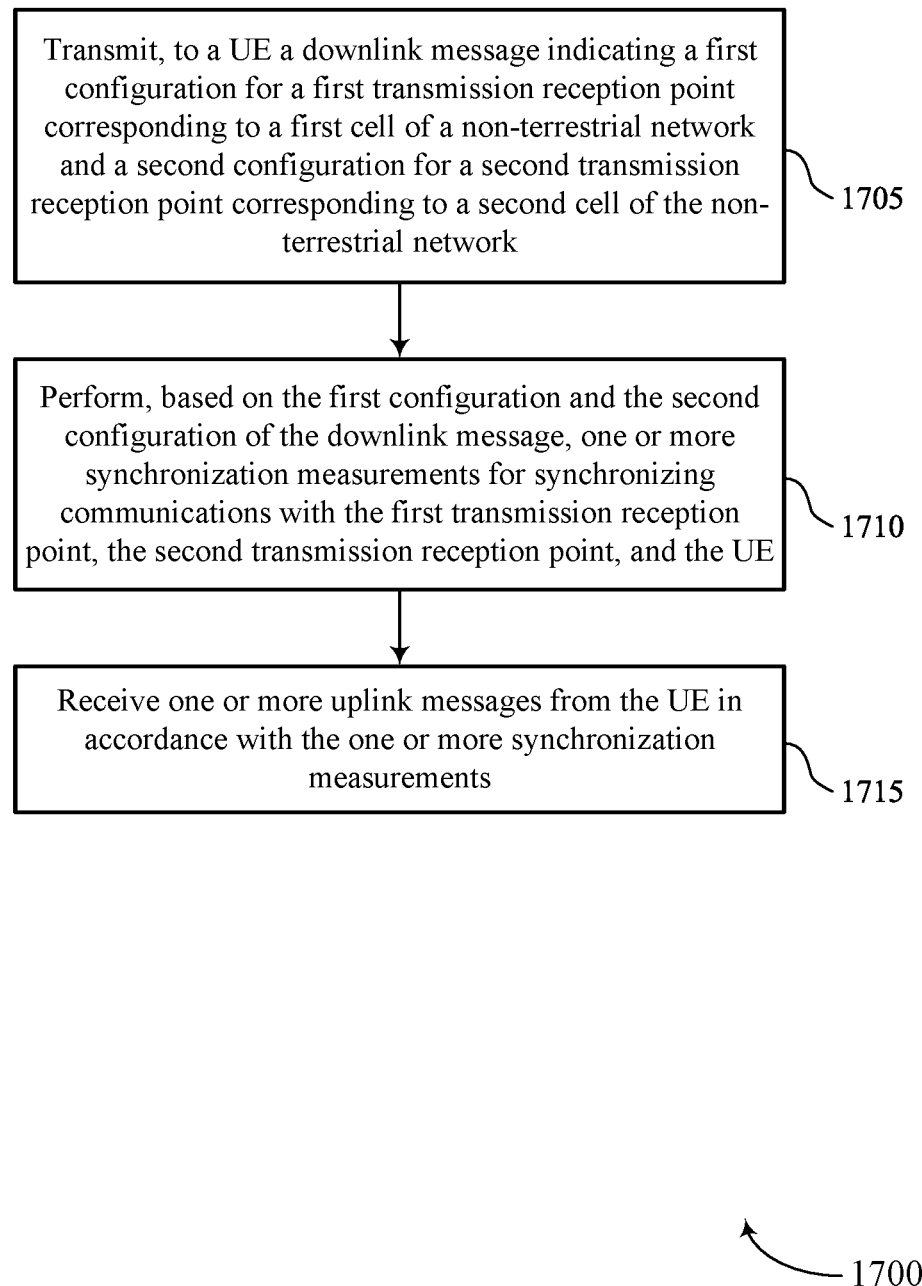

FIG. 17 illustrates a flowchart illustrating a method 1700 that supports synchronization for mTRP communications in NTNs in accordance with one or more aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, to a UE a downlink message indicating a first configuration for a first transmission reception point corresponding to a first cell of a non-terrestrial network and a second configuration for a second transmission reception point corresponding to a second cell of the non-terrestrial network. The operations of 1705 may be performed in accordance with examples as disclosed herein. In some examples, aspects of the operations of 1705 may be performed by a mTRP communication configuration component 1125 as described with reference to FIG. 11.

At 1710, the method may include performing, based on the first configuration and the second configuration of the downlink message, one or more synchronization measurements for synchronizing communications with the first transmission reception point, the second transmission reception point, and the UE. The operations of 1710 may be performed in accordance with examples as disclosed herein. In some examples, aspects of the operations of 1710 may be performed by a synchronization component 1130 as described with reference to FIG. 11.

At 1715, the method may include receiving one or more uplink messages from the UE in accordance with the one or more synchronization measurements. The operations of 1715 may be performed in accordance with examples as disclosed herein. In some examples, aspects of the operations of 1715 may be performed by an uplink communications component 1135 as described with reference to FIG. 11.

The following provides an overview of aspects of the present disclosure:

Aspect 1: A method for wireless communication at a UE, comprising: receiving a downlink message indicating a first configuration for a first TRP corresponding to a first cell of an NTN and a second configuration for a second TRP corresponding to a second cell of the NTN; performing, based at least in part on the first configuration and the second configuration of the downlink message, one or more synchronization measurements for synchronizing uplink communications with the first TRP and the second TRP; and transmitting one or more uplink messages to the first TRP, the second TRP, or both, in accordance with the one or more synchronization measurements.

Aspect 2: The method of aspect 1, wherein the downlink message comprises a CORESET configuration message, the method further comprising: receiving an indication of the first TRP based at least in part on a first CORESET pool index of the CORESET configuration message and the second TRP based at least in part on a second CORESET pool index of the CORESET configuration message.

Aspect 3: The method of aspect 2, further comprising: decoding first TCI state information associated with the first CORESET pool index and second TCI state information associated with the second CORESET pool index, wherein the first TCI state information comprises the first configuration for the first TRP and the second TCI state information comprises the second configuration for the second TRP.

Aspect 4: The method of any of aspects 1 through 3, wherein the downlink message comprises a unified TCI state information message, the method further comprising: receiving the first configuration for the first TRP and the second configuration for the second TRP based at least in part on the unified TCI state information message.

Aspect 5: The method of aspect 4, wherein the unified TCI state information message comprises joint downlink and uplink TCI state information, or separate downlink and uplink TCI state information, SSB-MTC information, or any combination thereof.

Aspect 6: The method of any of aspects 4 through 5, further comprising: performing, based at least in part on the unified TCI state information message, the one or more synchronization measurements on one or more SSBs associated with the first cell and the second cell of the NTN by applying respective timing advances for the one or more synchronization measurements.

Aspect 7: The method of any of aspects 1 through 6, wherein the downlink message comprises a spatial relation information message, the method further comprising: receiving the first configuration for the first TRP and the second configuration for the second TRP based at least in part on the spatial relation information message.

Aspect 8: The method of aspect 7, wherein the spatial relation information message comprises a SSB information field corresponding to the first cell, the second cell, or both, that indicates the first configuration for the first TRP, the second configuration for the second TRP, or both.

Aspect 9: The method of any of aspects 7 through 8, wherein the spatial relation information message comprises SRS positioning information corresponding to the first configuration for the first TRP and the second configuration for the second TRP.

Aspect 10: The method of any of aspects 7 through 9, wherein the spatial relation information message comprises an indication of SRSs corresponding to the first configuration for the first TRP and the second configuration for the second TRP.

Aspect 11: The method of any of aspects 7 through 10, wherein the spatial relation information message comprises an indication of physical uplink control channels corresponding to the first configuration for the first TRP and the second configuration for the second TRP.

Aspect 12: The method of any of aspects 1 through 11, further comprising: transmitting, to a network entity, a message that indicates a capability of the UE to communicate with the first TRP and the second TRP in the NTN.

Aspect 13: The method of any of aspects 1 through 12, wherein the second configuration comprises a configuration of a virtual cell, and performing the one or more synchronization measurements further comprises: performing the one or more synchronization measurements relative to the virtual cell that is spatially in between the first TRP and the second TRP to synchronize the uplink communications at least partially with the first TRP and the second TRP; and transmitting the one or more uplink messages to the first TRP and the second TRP based at least in part on performing the one or more synchronization measurements relative to the virtual cell.

Aspect 14: The method of any of aspects 1 through 13, wherein receiving the downlink message further comprises: receiving a third configuration for a third TRP corresponding to a third cell of the NTN; and performing, based at least in part on the third configuration, the one or more synchronization measurements to synchronize the uplink communications with the first TRP, the second TRP, and the third TRP.

Aspect 15: The method of any of aspects 1 through 14, wherein the first configuration for the first TRP and the second configuration for the second TRP comprise timing information, non-terrestrial network configuration information, a physical cell identifier, a virtual cell identifier, or any combination thereof.

Aspect 16: The method of any of aspects 1 through 15, wherein the one or more synchronization measurements comprise Doppler shift pre-compensation measurements associated with the first TRP and the second TRP in the NTN.

Aspect 17: The method of any of aspects 1 through 16, wherein the first configuration for the first TRP comprises a first physical cell identifier or a first virtual cell identifier, and the second configuration for the second TRP comprises a second physical cell identifier or a second virtual cell identifier.

Aspect 18: A method for wireless communication at a network entity, comprising: transmitting, to a UE a downlink message indicating a first configuration for a first TRP corresponding to a first cell of an NTN and a second configuration for a second TRP corresponding to a second cell of the NTN; performing, based at least in part on the first configuration and the second configuration of the downlink message, one or more synchronization measurements for synchronizing communications with the first TRP, the second TRP, and the UE; and receiving one or more uplink messages from the UE in accordance with the one or more synchronization measurements.

Aspect 19: The method of aspect 18, wherein the downlink message comprises a CORESET configuration message, the method further comprising: transmitting, to the UE, an indication of the first TRP based at least in part on a first CORESET pool index of the CORESET configuration message and the second TRP based at least in part on a second CORESET pool index of the CORESET configuration message.

Aspect 20: The method of aspect 19, wherein the downlink message further comprises first TCI state information associated with the first CORESET pool index and second TCI state information associated with the second CORESET pool index, and the first TCI state information comprises the first configuration for the first TRP and the second TCI state information comprises the second configuration for the second TRP.

Aspect 21: The method of any of aspects 18 through 20, wherein the downlink message comprises a unified TCI state information message, the method further comprising: transmitting, to the UE, the first configuration for the first TRP and the second configuration for the second TRP based at least in part on the unified TCI state information message.

Aspect 22: The method of aspect 21, wherein the unified TCI state information message comprises joint downlink and uplink TCI state information, or separate downlink and uplink TCI state information, SSB-machine type communication information, or a combination thereof.

Aspect 23: The method of any of aspects 18 through 22, wherein the downlink message comprises a spatial relation information message, the method further comprising: transmitting, to the UE, the first configuration for the first TRP and the second configuration for the second TRP based at least in part on the spatial relation information message.

Aspect 24: The method of aspect 23, wherein the spatial relation information message comprises a SSB information field corresponding to the first cell, the second cell, or both, that indicates the first configuration for the first TRP, the second configuration for the second TRP, or both.

Aspect 25: The method of any of aspects 23 through 24, wherein the spatial relation information message comprises SRS positioning information corresponding to the first configuration for the first TRP and the second configuration for the second TRP.

Aspect 26: The method of any of aspects 18 through 25, further comprising: receiving a message that indicates a capability of the UE to communicate with the first TRP and the second TRP in the NTN.

Aspect 27: The method of any of aspects 18 through 26, wherein the second configuration comprises a configuration of a virtual cell, the method further comprising: receiving, from the UE, the one or more uplink messages synchronized to the virtual cell; and performing one or more post-processing procedures to synchronize the one or more uplink messages to timings of the first cell and the second cell.

Aspect 28: The method of any of aspects 18 through 27, wherein receiving the downlink message further comprises: transmitting a third configuration for a third TRP corresponding to a third cell of the NTN; and performing, based at least in part on the third configuration, the one or more synchronization measurements to synchronize the communications with the first TRP, the second TRP, the third TRP, and the UE.

Aspect 29: An apparatus for wireless communication at a UE, comprising a processor; memory coupled with the processor; and instructions stored in the memory and executable by the processor to cause the apparatus to perform a method of any of aspects 1 through 17.

Aspect 30: An apparatus for wireless communication at a UE, comprising at least one means for performing a method of any of aspects 1 through 17.

Aspect 31: A non-transitory computer-readable medium storing code for wireless communication at a UE, the code comprising instructions executable by a processor to perform a method of any of aspects 1 through 17.

Aspect 32: An apparatus for wireless communication at a network entity, comprising a processor; memory coupled with the processor; and instructions stored in the memory and executable by the processor to cause the apparatus to perform a method of any of aspects 18 through 28.

Aspect 33: An apparatus for wireless communication at a network entity, comprising at least one means for performing a method of any of aspects 18 through 28.

Aspect 34: A non-transitory computer-readable medium storing code for wireless communication at a network entity, the code comprising instructions executable by a processor to perform a method of any of aspects 18 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving a downlink message indicating a first configuration for a first transmission reception point corresponding to a first cell of a non-terrestrial network and a second configuration for a second transmission reception point corresponding to a second cell of the non-terrestrial network, wherein at least the first transmission reception point and the first cell are moving at a first speed relative to the UE;

performing, based at least in part on the first configuration, the second configuration, and the first speed, one or more synchronization measurements for synchronizing uplink communications with the first transmission reception point and the second transmission reception point; and transmitting one or more uplink messages to the first transmission reception point, the second transmission reception point, or both, in accordance with the one or more synchronization measurements.

2. The method of claim 1, wherein the downlink message comprises a control resource set configuration message, the method further comprising:
receiving an indication of the first transmission reception point based at least in part on a first control resource set pool index of the control resource set configuration message and the second transmission reception point based at least in part on a second control resource set pool index of the control resource set configuration message.

3. The method of claim 2, further comprising:
decoding first transmission configuration indicator state information associated with the first control resource set pool index and second transmission configuration indicator state information associated with the second control resource set pool index, wherein the first transmission configuration indicator state information comprises the first configuration for the first transmission reception point and the second transmission configuration indicator state information comprises the second configuration for the second transmission reception point.

4. The method of claim 1, wherein the downlink message comprises a unified transmission configuration indicator state information message, the method further comprising:
receiving the first configuration for the first transmission reception point and the second configuration for the second transmission reception point based at least in part on the unified transmission configuration indicator state information message.

5. The method of claim 4, wherein the unified transmission configuration indicator state information message comprises joint downlink and uplink transmission configuration indicator state information, or separate downlink and uplink transmission configuration indicator state information, synchronization signal block-machine type communication information, or any combination thereof.

6. The method of claim 4, further comprising:
performing, based at least in part on the unified transmission configuration indicator state information message, the one or more synchronization measurements on one or more synchronization signal blocks associated with the first cell and the second cell of the non-terrestrial network by applying respective timing advances for the one or more synchronization measurements.

7. The method of claim 1, wherein the downlink message comprises a spatial relation information message, the method further comprising:
receiving the first configuration for the first transmission reception point and the second configuration for the second transmission reception point based at least in part on the spatial relation information message.

8. The method of claim 7, wherein the spatial relation information message comprises a synchronization signal block information field corresponding to the first cell, the second cell, or both, that indicates the first configuration for the first transmission reception point, the second configuration for the second transmission reception point, or both.

9. The method of claim 7, wherein the spatial relation information message comprises sounding reference signal positioning information corresponding to the first configuration for the first transmission reception point and the second configuration for the second transmission reception point.

10. The method of claim 7, wherein the spatial relation information message comprises an indication of sounding reference signals corresponding to the first configuration for the first transmission reception point and the second configuration for the second transmission reception point.

11. The method of claim 7, wherein the spatial relation information message comprises an indication of physical uplink control channels corresponding to the first configuration for the first transmission reception point and the second configuration for the second transmission reception point.

12. The method of claim 1, further comprising:
transmitting, to a network entity, a message that indicates a capability of the UE to communicate with the first transmission reception point and the second transmission reception point in the non-terrestrial network.

13. The method of claim 1, wherein the second configuration comprises a configuration of a virtual cell, and performing the one or more synchronization measurements further comprises:
performing the one or more synchronization measurements relative to the virtual cell that is spatially in between the first transmission reception point and the second transmission reception point to synchronize the uplink communications at least partially with the first transmission reception point and the second transmission reception point; and
transmitting the one or more uplink messages to the first transmission reception point and the second transmission reception point based at least in part on performing the one or more synchronization measurements relative to the virtual cell.

14. The method of claim 1, wherein receiving the downlink message further comprises:
receiving a third configuration for a third transmission reception point corresponding to a third cell of the non-terrestrial network; and
performing, based at least in part on the third configuration, the one or more synchronization measurements to synchronize the uplink communications with the first transmission reception point, the second transmission reception point, and the third transmission reception point.

15. The method of claim 1, wherein the first configuration for the first transmission reception point and the second configuration for the second transmission reception point comprise timing information, non-terrestrial network configuration information, a physical cell identifier, a virtual cell identifier, or any combination thereof.

16. The method of claim 1, wherein the one or more synchronization measurements comprise Doppler shift pre-compensation measurements associated with the first transmission reception point and the second transmission reception point in the non-terrestrial network.

17. The method of claim 1, wherein the first configuration for the first transmission reception point comprises a first physical cell identifier or a first virtual cell identifier, and the second configuration for the second transmission reception point comprises a second physical cell identifier or a second virtual cell identifier.

18. A method for wireless communication at a network entity, comprising:
transmitting, to a user equipment (UE) a downlink message indicating a first configuration for a first transmission reception point corresponding to a first cell of a non-terrestrial network and a second configuration for a second transmission reception point corresponding to a second cell of the non-terrestrial network, wherein at least the first transmission reception point and the first cell are moving at a first speed relative to the UE;

performing, based at least in part on the first configuration, the second configuration, and the first speed, one or more synchronization measurements for synchronizing communications with the first transmission reception point, the second transmission reception point, and the UE; and receiving one or more uplink messages from the UE in accordance with the one or more synchronization measurements.

19. The method of claim 18, wherein the downlink message comprises a control resource set configuration message, the method further comprising:

transmitting, to the UE, an indication of the first transmission reception point based at least in part on a first control resource set pool index of the control resource set configuration message and the second transmission reception point based at least in part on a second control resource set pool index of the control resource set configuration message.

20. The method of claim 19, wherein the downlink message further comprises first transmission configuration indicator state information associated with the first control resource set pool index and second transmission configuration indicator state information associated with the second control resource set pool index, and the first transmission configuration indicator state information comprises the first configuration for the first transmission reception point and the second transmission configuration indicator state information comprises the second configuration for the second transmission reception point.

21. The method of claim 18, wherein the downlink message comprises a unified transmission configuration indicator state information message, the method further comprising:

transmitting, to the UE, the first configuration for the first transmission reception point and the second configuration for the second transmission reception point based at least in part on the unified transmission configuration indicator state information message.

22. The method of claim 21, wherein the unified transmission configuration indicator state information message comprises joint downlink and uplink transmission configuration indicator state information, or separate downlink and uplink transmission configuration indicator state information, synchronization signal block-machine type communication information, or a combination thereof.

23. The method of claim 18, wherein the downlink message comprises a spatial relation information message, the method further comprising:

transmitting, to the UE, the first configuration for the first transmission reception point and the second configuration for the second transmission reception point based at least in part on the spatial relation information message.

24. The method of claim 23, wherein the spatial relation information message comprises a synchronization signal block information field corresponding to the first cell, the second cell, or both, that indicates the first configuration for the first transmission reception point, the second configuration for the second transmission reception point, or both.

25. The method of claim 23, wherein the spatial relation information message comprises sounding reference signal positioning information corresponding to the first configuration for the first transmission reception point and the second configuration for the second transmission reception point.

26. The method of claim 18, further comprising:
receiving a message that indicates a capability of the UE to communicate with the first transmission reception point and the second transmission reception point in the non-terrestrial network.

27. The method of claim 18, wherein the second configuration comprises a configuration of a virtual cell, the method further comprising:

receiving, from the UE, the one or more uplink messages synchronized to the virtual cell; and performing one or more post-processing procedures to synchronize the one or more uplink messages to timings of the first cell and the second cell.

28. The method of claim 18, wherein receiving the downlink message further comprises:

transmitting a third configuration for a third transmission reception point corresponding to a third cell of the non-terrestrial network; and performing, based at least in part on the third configuration, the one or more synchronization measurements to synchronize the communications with the first transmission reception point, the second transmission reception point, the third transmission reception point, and the UE.

29. An apparatus for wireless communication at a user equipment (UE), comprising:

a processor;
memory coupled with the processor; and
instructions stored in the memory and executable by the processor to cause the apparatus to:

receive a downlink message indicating a first configuration for a first transmission reception point corresponding to a first cell of a non-terrestrial network and a second configuration for a second transmission reception point corresponding to a second cell of the non-terrestrial network, wherein at least the first transmission reception point and the first cell are moving at a first speed relative to the UE;

perform, based at least in part on the first configuration, the second configuration, and the first speed, one or more synchronization measurements for synchronizing uplink communications with the first transmission reception point and the second transmission reception point; and transmit one or more uplink messages to the first transmission reception point, the second transmission reception point, or both, in accordance with the one or more synchronization measurements.

30. An apparatus for wireless communication at a network entity, comprising:

a processor;
memory coupled with the processor; and
instructions stored in the memory and executable by the processor to cause the apparatus to:

transmit, to a user equipment (UE) a downlink message indicating a first configuration for a first transmission reception point corresponding to a first cell of a non-terrestrial network and a second configuration for a second transmission reception point corresponding to a second cell of the non-terrestrial network, wherein at least the first transmission reception point and the first cell are moving at a first speed relative to the UE;

perform, based at least in part on the first configuration, the second configuration, and the first speed, one or more synchronization measurements for synchronizing communications with the first transmission reception point, the second transmission reception point, and the UE; and receive one or more uplink messages from the UE in accordance with the one or more synchronization measurements.

* * * * *